United States Patent [19]

Fago

[11] Patent Number: 5,062,130
[45] Date of Patent: Oct. 29, 1991

[54] X-RAY FILM CASSETTE TRANSPORT

[75] Inventor: Frank M. Fago, Mason, Ohio

[73] Assignee: Liebel-Flarsheim Company, Cincinnati, Ohio

[21] Appl. No.: 618,057

[22] Filed: Nov. 26, 1990

[51] Int. Cl.$^5$ .............................................. G03B 42/02
[52] U.S. Cl. ...................................... 378/181; 378/172; 378/173
[58] Field of Search ................ 378/172, 173, 174–176, 378/181

[56] References Cited

U.S. PATENT DOCUMENTS

| | | | |
|---|---|---|---|
| 2,583,213 | 1/1952 | Graves | 250/62 |
| 2,921,202 | 1/1960 | Berger et al. | 250/105 |
| 3,173,010 | 3/1965 | Barrett et al. | 250/66 |
| 3,710,106 | 1/1973 | Loucheur | 250/66 |
| 3,770,975 | 11/1973 | Peyser et al. | 250/491 |
| 3,771,781 | 11/1973 | Lacket et al. | 269/218 |
| 3,777,162 | 12/1973 | Peyser | 250/468 |
| 3,826,922 | 7/1974 | Ingles | 250/471 |
| 3,828,196 | 8/1974 | Mika et al. | 250/468 |
| 3,829,698 | 8/1974 | Goetz | 250/468 |
| 3,832,559 | 8/1974 | Thomas et al. | 250/468 |
| 3,848,134 | 11/1974 | Gieschen et al. | 250/471 |
| 3,904,531 | 9/1975 | Barrett et al. | 250/444 |
| 3,920,997 | 11/1975 | Munch | 250/468 |
| 3,968,374 | 7/1976 | Schroeder | 250/468 |
| 3,976,887 | 8/1976 | Holzermer et al. | 250/468 |
| 3,986,034 | 10/1976 | Wittkopp et al. | 250/468 |
| 3,989,950 | 11/1976 | Hunt et al. | 250/468 |
| 4,031,400 | 6/1977 | Hunt et al. | 250/468 |
| 4,049,967 | 9/1977 | Berger et al. | 250/455 T |
| 4,071,767 | 1/1978 | Pury et al. | 250/444 |
| 4,092,783 | 6/1978 | Hodges | 33/180 R |
| 4,099,063 | 7/1978 | Pury et al. | 250/513 |
| 4,104,529 | 8/1978 | Gaudel | 250/470 |
| 4,105,920 | 8/1978 | Pury et al. | 250/402 |
| 4,152,604 | 5/1979 | Barbury | 250/402 |
| 4,249,079 | 2/1981 | Thomas | 250/468 |
| 4,329,589 | 5/1982 | Stievenart et al. | 250/468 |
| 4,416,020 | 11/1983 | Wagner et al. | 378/181 |
| 4,426,724 | 1/1984 | Cutter | 378/181 |
| 4,432,095 | 2/1984 | Adelmeyer et al. | 378/181 |
| 4,455,672 | 6/1984 | Hahn et al. | 378/181 |
| 4,489,428 | 12/1984 | Schweiker | 378/176 |
| 4,514,958 | 5/1985 | Hoorn | 53/266 R |
| 4,538,293 | 8/1985 | Cutter | 378/181 |
| 4,539,696 | 9/1985 | Walling et al. | 378/181 |
| 4,542,521 | 9/1985 | Hahn et al. | 378/155 |
| 4,553,369 | 11/1985 | Debes et al. | 53/55 |
| 4,559,641 | 12/1985 | Caugant et al. | 378/181 |
| 4,577,452 | 3/1986 | Hösel et al. | 53/266 R |
| 4,590,738 | 5/1986 | Hösel et al. | 53/266 R |
| 4,651,337 | 3/1987 | Boomgaarden et al. | 378/177 |
| 4,675,894 | 6/1987 | Ohlson | 378/181 |
| 4,692,083 | 9/1987 | LeRoux et al. | 414/411 |
| 4,845,733 | 7/1989 | Dieterlen et al. | 378/177 |
| 4,845,734 | 7/1989 | Maki et al. | 378/181 |
| 4,930,147 | 5/1990 | Dieterlen et al. | 378/181 |

FOREIGN PATENT DOCUMENTS

| | | |
|---|---|---|
| 68212 | 5/1983 | European Pat. Off. |
| 1949764 | 4/1971 | Fed. Rep. of Germany |
| 2239825 | 2/1974 | Fed. Rep. of Germany |
| 2333157 | 1/1975 | Fed. Rep. of Germany |
| 8006306 | 7/1980 | Fed. Rep. of Germany |
| 3033208 | 4/1982 | Fed. Rep. of Germany |
| 3034282 | 4/1982 | Fed. Rep. of Germany |
| 1104487 | 11/1955 | France |
| 2483212 | 12/1981 | France |
| 536650 | 5/1941 | United Kingdom |
| 1358660 | 7/1974 | United Kingdom |

*Primary Examiner*—Edward P. Westin
*Assistant Examiner*—David P. Porta
*Attorney, Agent, or Firm*—Wood, Herron & Evans

[57] ABSTRACT

A trayless film cassette transport apparatus is disclosed which includes an improved cassette gripping system which allows an x-ray film cassette to be loaded through a window; then gripped and withdrawn inwardly to a properly centered exposure position; then ejected to project partially from the window by a distance switch is automatically determined in accordance with the size of the cassette. This ensures that small cassettes project far enough from the window to be readily grasped by an operator while avoiding ejecting large cassettes so far that they are precariously balanced in the window. The novel gripper holds the cassette securely under a self-locking condition, such that the gripping force on the cassette increases in response to and at a greater rate than an improperly imposed cassette withdrawing force.

36 Claims, 11 Drawing Sheets

X-RAY FILM CASSETTE TRANSPORT

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent & Trademark Office patent file or records, but otherwise reserves all copyright rights whatsoever.

FIELD OF THE INVENTION

The invention relates to the field of radiation imaging. More particularly, the invention relates to a trayless film cassette transport apparatus which includes an improved cassette gripping system.

BACKGROUND OF THE INVENTION

In the x-ray imaging art it is common practice to house sheets of film within cassettes which serve to support and mechanically protect the film as well as to shield it from ambient light. Such cassettes are generally square or rectangular in shape and come in a variety of sizes.

After being loaded with a sheet of unexposed film, the cassette itself must be loaded into the x-ray imaging machine and centered at a desired location prior to being exposed to radiation which has been directed through a portion of the body of a person or some other object to be imaged. Following exposure, the cassette must be removed from the imaging machine so that the exposed film can be removed from the cassette and developed. The evolution of the prior art has brought a variety of cassette handling systems for facilitating these operations.

As exemplified by U.S. Pat. Nos. 3,826,922 to Ingles and 3,829,698 to Goetz, one general approach has been to provide the x-ray imaging machine with a slidable drawer or Bucky tray for supporting the cassette. The interior of the tray is provided with a cassette positioning device for properly centering cassettes of different sizes. Some trays have been provided with a matrix of properly spaced holes into which pins can be inserted adjacent the edges of the cassette to hold it on center. Those are slow to use when cassette sizes must be changed and loose pins can become lost or jam the equipment.

Other positioning devices used inside trays, such as shown in the aforementioned Ingles patent, include two opposed pairs of cassette clamps movably mounted in guide slots and connected to a linkage of rigid members. Such linkages are constructed so that each clamp in a pair can be moved congruently toward and away from one another to effect bi-directional centering of random sizes of cassettes. These proved easier to use and therefore more efficient than the pin-matrix designs but suffered from a disadvantage common to all designs using trays. Namely, the tray itself required considerable clearance adjacent the x-ray machine to permit the tray to be fully open. To overcome this drawback, so-called "trayless" cassette transport systems have been developed.

An example of such a trayless device is described in commonly assigned U.S. Pat. No. 4,485,733 to Dieterlen et al. which is expressly incorporated herein by reference in its entirety. That device provides for the loading and unloading of a cassette into an x-ray apparatus through a window. Upon partial insertion of a cassette into the window, the cassette is engaged near its leading edge between opposing jaws of a gripper assembly which is slidably mounted on a movable carriage. Then, a pair of channels which move congruently toward one another with respect to a given axis are moved into engagement with the sides of the cassette to center the cassette about that axis. The gripper then withdraws the cassette inwardly by a distance related to the size of the cassette to center it about a second axis. The entire carriage, including the gripper, is then translated to move the cassette to an exposure position. Following exposure, the carriage is translated in the opposite direction to position the cassette in alignment with the window. To eject the cassette, the gripper is then moved toward its home position where it both stops and releases the cassette. The means by which it does so can be better understood with particular reference to FIG. 4 of the Dieterlen et al. '733 patent as described below.

The gripper assembly (40) of the '733 patent includes a cassette supporting plate (42) which carries a bearing block (48) upon which a spring-loaded upper jaw (52) is pivotably mounted. The upper jaw (52) is linked to an opposed lower jaw (64) mounted on the other side of plate (42). The lower jaw carries a roller which moves either upward through an opening in plate (42) to engage a detent on the cassette or downward through the opening to release a cassette. A spring (70) normally biases jaws (52) and (64) together to grip a cassette with a force that is limited by the strength of spring (72). However, when the gripper assembly is driven toward the window to its home location, a cam follower (73) that is connected to the lower jaw (64) by means of a follower (74) engages a cam ramp (76). This engagement overcomes spring (72) and opens jaws (52) and (64) so that they release the cassette.

A drawback of the above design is that the gripper cannot release the cassette until the gripper is positioned at its home position which lies a fixed distance from the window. If the home position is so located with respect to the window that a readily graspable portion of a small cassette projects unsupported from the window when the small cassette is ejected, an even larger portion of a large cassette will lie unsupported when that large cassette is ejected. This can result in the large cassette being precariously balanced upon ejection.

Thus, there is a need for an x-ray cassette transport apparatus which ejects a cassette by releasing it and arresting the ejection movement of the gripper at a desired ejection point whose distance from the window is determined in accordance with the size of the cassette.

It is also observed that in the gripper assembly described in the Dieterlen '773 patent, the force with which a cassette is gripped depends on the stiffness of the spring (70). Thus, for secure gripping, a fairly stiff spring must be used. However, the spring can grow weaker over time. Also, no matter how stiff the spring, there is no guarantee that the cassette will not be subjected to a withdrawal force greater than that which the spring can effectively counteract. These possibilities increase the risk of a cassette coming loose from the gripper and becoming improperly positioned or jammed inside the x-ray machine.

It can also be appreciated that in the gripper of the Dieterlen '733 patent, the motor which drives the gripper home must be powerful enough to overcome the spring. The requirement of having a stiff spring is contrary to the design objective of providing a less powerful and therefore less expensive motor. Accordingly, there has also been a need for an x-ray film cassette transport which can be driven with a motor of modest size, but which grips a cassette securely. In particular, there has been a need for a transport apparatus having a self-locking cassette gripper designed so that the gripping force exerted on a cassette increases in response to and at a greater rate than a cassette withdrawal force.

SUMMARY OF THE INVENTION

In order to fulfill the needs mentioned above, as well as to provide other advantages, the invention provides a trayless film cassette transport apparatus having an improved cassette gripping system which allows a cassette to be loaded through a window; then gripped and withdrawn inwardly to a properly centered exposure position; then ejected to project partially from the window by a distance which is automatically determined according to the size of the cassette. This ensures that small cassettes project far enough from the window to be readily grasped by an operator while avoiding ejecting large cassettes so far that they are precariously balanced in the window. This is achieved by means of a unique gripper mechanism and control.

According to the invention, the gripper is mounted for reciprocal movement along a track between a home position located adjacent the window and a retracted position spaced farther away from the window. The gripper also includes a cam follower which, as the gripper travels along the track, moves along a cam surface which, according to a further aspect of the invention, takes the form of a slot formed in the track. The cam surface includes first and second portions which lie offset from one another. A mechanical linkage connects the cam follower to a jaw which moves between cassette-engaging and cassette-disengaging positions as the cam follower moves in the direction of the aforementioned offset as a result of the gripper being driven back and forth along the length of the track. When a cassette is inserted through the window by an operator into grippable proximity of the gripper, as sensed by a novel sensing system constructed according to yet another aspect of the invention, the gripper is driven from home toward the retracted position in a cassette-loading movement.

The initial portion of the cassette-loading movement causes the cam follower to move in the direction of the offset between the first and second portions of the cam surface. A special linkage causes the jaw to assume its cassette-engaging position where it remains throughout most of the movement of the gripper to its final retracted position.

Further according to the invention, sensors generate signals which are utilized by the controller in order to determine the size of the cassette. Based on that information, the controller calculates the appropriate retracted position whereat the gripper is stopped to properly center a cassette of that particular size along the axis along which it is moved by the gripper.

From the retracted position, following exposure of the film inside the cassette, the gripper commences a cassette-ejecting movement back toward the home position. As the cassette-ejecting movement of the gripper proceeds, the cam follower engages the other portion of the cam surface causing the cam follower to move in the opposite sense along the direction of the offset. The gripper linkage simultaneously moves the jaw from its cassette-engaging to its cassette-disengaging position, thus releasing the cassette from the gripper before the gripper reaches its home position. The controller then stops to arrest the cassette-ejecting movement of the gripper at an ejection position whose distance from the home position is determined by the size of the cassette. The gripper remains at the ejection position until the cassette is manually withdrawn clear of an entry sensor whereupon the gripper moves back to the home position to await loading of the next cassette.

The invention further contemplates combining the above gripper mechanism with a pair of reciprocable guides for centering the cassette about the aforementioned axis prior to the completion of the cassette-loading movement of the gripper.

According to still another aspect of the invention, the gripper is designed to engage the cassette under a self-locking condition such that the gripping force on the cassette increases in response to and at a greater rate than an improperly imposed cassette-withdrawal force.

These and other aspects and advantages of the invention will become apparent to those of ordinary skill in the art upon review of the claims, the detailed description of the preferred embodiment and the accompanying drawings wherein like reference numerals designate like items.

BRIEF DESCRIPTION OF THE DRAWINGS

FIGS. 8 through 12 are simplified flowcharts illustrating the operation of the apparatus of FIG. 1 with reference to the software program executed by the controller shown there. In particular, FIG. 8 illustrates the main loop;

FIG. 10 illustrates the "ACL EJECT" routine;

FIG. 12 illustrates the "GUIDES HOME" routine.

DETAILED DESCRIPTION OF THE PREFERRED EMBODIMENT

Figure 1:
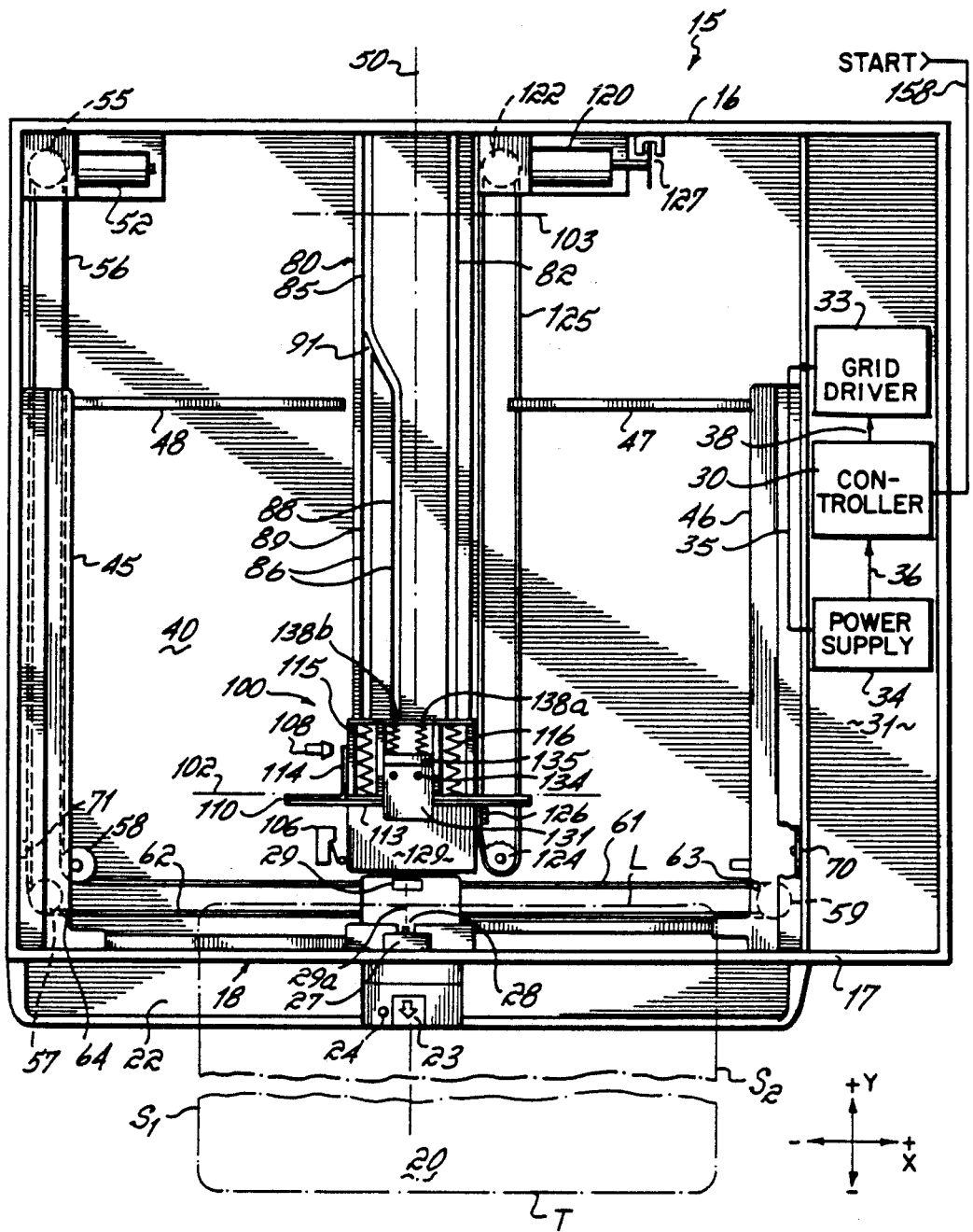
FIG. 1 is a plan view of a preferred embodiment of a cassette-transport apparatus constructed according to the invention and which shows the gripper at its home position along its track and the guides at their respective home positions.

Referring to FIG. 1, a preferred embodiment of a cassette transport apparatus 15 according to the invention includes a generally rectangular housing 16 which preferably forms part of a Bucky having an oscillatable anti-scatter grid (not shown). Housing 16 has a front wall 17 in which is formed a window 18 which takes the form of a rectangular slot through which a cassette 20 of a desired range of sizes can be passed. To facilitate loading of a cassette, an inclined loading ramp 22 preferably extends outwardly in the $-y$ direction and slightly downwardly from front wall 17 at a location beneath window 18. An eject pushbutton 23 is mounted flushly on loading ramp 22 as is a cassette-present light 24 which is lighted to indicate whenever a cassette is present inside apparatus 15. Pushbutton 23 and light 24 each communicate directly or indirectly by way of suitable signal conditioning circuits (not shown) to a microprocessor-based controller 30 which will be described in further detail later in this document.

Inside window 18 there is mounted an entry sensor. In a preferred form, entry sensor comprises an infra-red LED transmitter 27 disposed above window 18 and a receiver 29 located beneath window 18. Transmitter 27 projects an infra-red beam 28 downwardly across window 18 to a receiver 29 which generates and transmits to controller 30 a signal indicating whether or not a portion of a cassette 20 obstructs a predetermined entry position 29a which lies at a point fixed along axis 50.

Controller 30 is preferably housed in a shielded compartment 31 inside housing 16. Also located inside compartment 31 are an optional Bucky grid driver 33 and a power supply 34. Controller 30 and grid driver 33 are each supplied operating power from power supply 34 by way of appropriate electrical connections 35 and 36. Controller 30 is also connected to optional grid driver 33 by way of other wiring connections 38 through which signals effective to initiate driving and stopping of the optional anti-scatter grid are transmitted. Preferably, electrical connections between eject pushbutton 23 and light 24 on one hand and controller 30 on the other are made at least in part by way of a large printed circuit board 40 whose non-conductive side occupies most of the base portion of housing 16 lying outside compartment 31.

Apparatus 15 includes a pair of guides 45 and 46 which reciprocate toward and away from one another along respective tracks 47 and 48 while always maintaining the same distance from a central axis 50 as its counterpart. That motion is also carried out under the direction of controller 30 which is operably connected to a guide motor 52 which may suitably be of the inexpensive D.C. brush type. In order to avoid operational difficulties which might otherwise be caused by the electromagnetic noise generated by motor 52, motor 52 should be connected to a suitable radio frequency interference suppression network such as a common mode filter. For the same reason, the electrical connections between motor 52 and controller 30 should be made by way of a separate shielded cable rather than by way of printed circuit board 40.

Motor 52 is connected to a toothed guide drive sprocket 55 around which is reaved a flexible plastic guide drive chain 56. Chain 56 is further reaved around additional sprockets 57, 58 and 59 to define a continuous, substantially L-shaped path as shown. The lower leg of that path comprises an inner portion 61 and an outer portion 62 which run parallel to one another in a direction substantially perpendicular to axis 50. The inner portion 61 of chain 56 is connected to the right-hand guide 46 at a point 63 while the outer portion 62 of chain 56 is connected to the left-hand guide 45. When guides 45 and 46 are positioned at their fully retracted home positions as illustrated in FIG. 1, a guide home limit switch 66 (shown in FIG. 2) generates and transmits to controller 30 a signal so indicating. It can be appreciated that when motor 52 drives sprocket 55 counter-clockwise, guides 45 and 46 will travel at even rates toward axis 50 and that upon reversal of motor 52, guides 45 and 46 will travel back toward their respective home positions at an similarly even rates. At least one and preferably both guides 45 and 46 have mounted thereon a sensor such as limit switches 70 and 71 for generating and transmitting to controller 30 a signal indicating engagement of guides 45 and 46 with the respective side portions S1 and S2 of cassette 20.

Also mounted inside housing 16, apparatus 15 includes an elongated track 80 whose longitudinal axis lies parallel to and preferably coincides with central axis 50. Track 50 is conveniently formed from a rectangular sheet of plastic or other suitable material into which has been milled or otherwise formed a straight guide slot 82 and a cam slot 83. In the preferred embodiment, cam slot 83 includes a straight upper segment 85 and a looped lower segment 86. Cam slot 83 defines a cam surface having a first portion 88 and a second portion 89. The left side wall of the right-hand side ($+x$ direction) side of segment 86 defines first portion 88 while second portion 89 is defined by the straight left side wall which is in common with both the straight upper segment 85 and the leftmost ($-x$ direction) side of the looped lower segment 86 of cam slot 83. Those skilled in the art will recognize that the cam surface need not be a continuous surface and that the operation of portions 88 and 89 thereof can be equivalently achieved by separate cams.

The upper and lower segments 85 and 86 of the aforementioned cam surface are bridged by a one-way gate which conveniently takes the form of a leaf spring 91, one end of which permanently adjoins the first portion 88 of the cam surface and whose other end is biased into contact with the second portion 89 thereof as illustrated in FIG. 1. As can best be seen with reference to FIGS. 2 and 3, the opposite end of the looped lower segment 86 of cam slot 83 is provided with a second one-way gate which conveniently takes the form of a second leaf spring 92 which extends from the rightmost side wall of segment 86 and is biased toward the opposing side wall to assume the position illustrated in FIG. 3.

With continuing reference to FIG. 1, there is mounted upon track 80 a gripper 100 which is slidably mounted upon track 50 for movement between at least a home position 102 which lies relatively close to window 18 and a maximum retracted position 103 which lies farther away from window 18 as measured along axis 50 in the $+y$ direction. Mounted upon PC board 40 there is a gripper home sensor which may conveniently take the form of a limit switch 106 which is disposed in fixed relation to home position 102 for generating and transmitting to controller 30 a signal indicating when gripper assembly 100 is present at home position 102.

Figure 7:
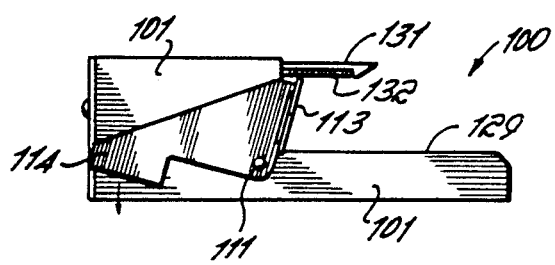
FIG. 7 is a side view of the gripper as viewed from line 7—7 of FIG. 2 wherein the gripper is in the released attitude depicted in FIG. 6.

Also mounted on PC board 40 in fixed relation to home position 102, a stationarily mounted sensing element 108 which forms a portion of a cassette presence sensing system. Sensing element 108 is suitably a retro-reflective type and is capable of generating and transmitting to controller 30 a signal indicating the presence of a cassette in grippable proximity to the gripper 100 when blocked by a movable actuator such as a flag plate 114 attached to a mechanical member 110. Member 110 is pivotably mounted to the body 101 of gripper 100 at a point 111 as can best be seen with reference to FIG. 7 and includes a cassette-contacting surface 113 which lies in a plane disposed for contact with the leading edge L of a cassette 20. Flag plate 114 is connected at a right angle to cassette-contacting surface 113 and is capable of pivoting into an active position lying in front of sensing element 108 when gripper 100 is positioned at its home position 102 and when the leading edge L of a cassette 20 is pressed against cassette-contacting surface 113. Upon concurrence of those two events, sensing element 108 generates and transmits to controller 30 the aforementioned signal indicating the presence of a cassette 20 in grippable proximity to gripper 100. A pair of weak springs 115 and 116 lie under slight compression between the rear of the cassette-contacting surface 113 of member 110 and the body 101 of the gripper 100 Those springs serve to normally bias flag plate 114 into an inactive position as shown in FIG. 7. When springs 115 and 116 are overcome by the leading edge L of a cassette 20 in forceable engagement with surface 113, actuating member 114 moves to an active position as indicated by the arrow in FIG. 7.

Gripper 100 is driven bi-directionally along track 80 by means of a gripper motor 120 which reversably drives a gripper drive sprocket 122. Aligned with sprocket 122 along an axis lying parallel to axis 50, printed circuit board 40 supports a passive sprocket 124. Around sprockets 122 and 124 there is reaved a continuous flexible, plastic gripper drive chain 125 in the form of an elongated loop running generally parallel to axis 50. For driving the gripper 100 along track 80, the leg of drive chain 125 lying adjacent gripper 100 is secured to body 101 by means of a suitable fastener 126.

Gripper motor 120 is driveably coupled to an optically isolated rotary encoder 127 which, whenever motor 120 is driven, generates and transmits to controller 30 pulse signals whose spacing is correlated to the distance travelled by gripper 100 along axis 50. In the preferred embodiment for example, encoder 127 provides 18 pulses per complete revolution of motor 120 and the effective gear ratio is 50 to 1. Accordingly, one revolution of gripper motor 120 moves gripper 100 along axis 50 a distance of about 0.059 inches which corresponds to about 305.084 pulses per inch.

Figure 4:
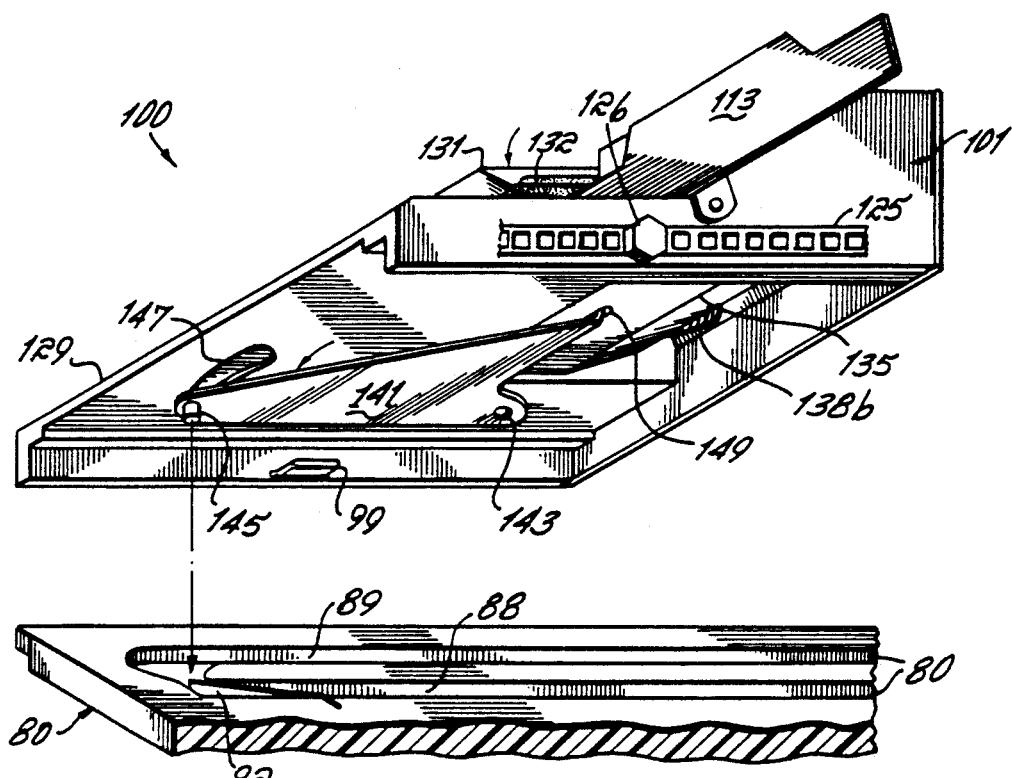
FIG. 4 is a perspective view of the gripper showing mainly its underside along with a perspective of a sectioned portion of the track.

In accordance with the invention, gripper 100 is so constructed as to effect a self-locking condition when it grips cassette 20. Under this self-locking condition, the cassette is ordinarily gripped securely but under relatively low force. However, if a withdrawal force is applied to cassette 20 along in the −y direction when it is engaged by gripper 100, the gripping force exerted by gripper 100 will increase in response to and at a greater rate than the withdrawal force. With particular reference now to FIGS. 2, 4, 5 and 6, further details of the structure of the gripper 100 will now be described. As seen in FIG. 4, the underside of body 101 includes at least one and preferably two projections 99 on either side thereof. These projections 99 engage in undercut formed along each of the long sides of track 80 parallel to axis 50 in order to hold gripper 100 securely on track 80. The body 101 may conveniently be formed of a rigid plastic or other suitable rigid material. Body 101 includes a planar lower shelf 129 which serves to support a portion of the bottom of a cassette 20 and provides a reaction force when the cassette is gripped by gripper 100. Opposed and parallel to shelf 129 there lies a movable cassette engaging member which, in the preferred embodiment, takes the form of a jaw 131 Jaw 131 is preferably formed from a plate of aluminum or other rigid, x-ray transparent material having affixed to its underside a layer 132 of high-friction material having a coefficient of static friction $\mu_s$ with respect to cassette 20 which is as high as practicable. In the preferred embodiment, layer 132 comprises a 0.065 inch thick layer of urethane rubber having a durometer of 50A ±5. However, other suitable materials can also be used.

Figure 5:
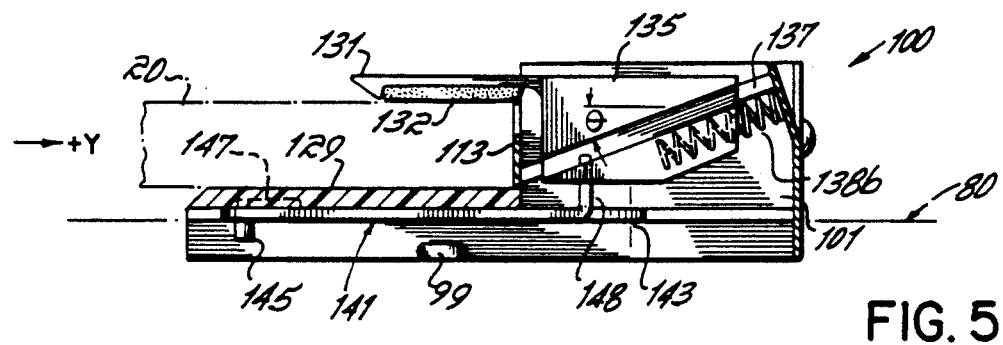
FIG. 5 is a side sectional view of the gripper taken along line 5—5 of FIG. 2 and showing a cassette engaged by the gripper.
Figure 6:
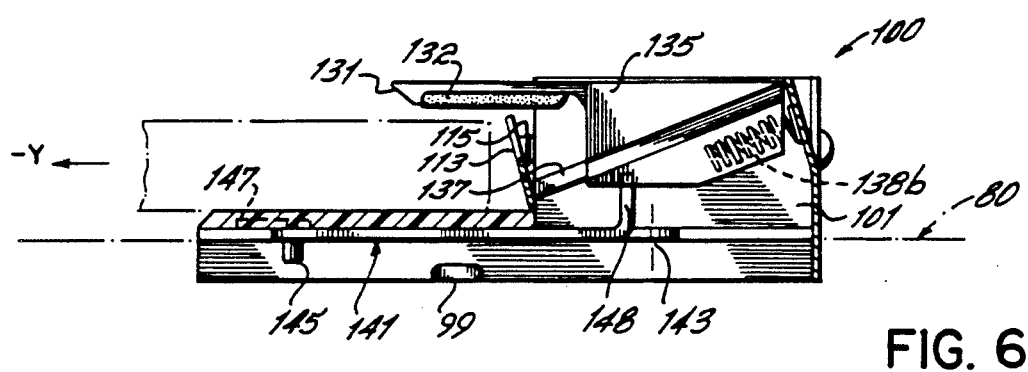
FIG. 6 is a view similar to that of FIG. 5 except showing a cassette released from the gripper.

Jaw 131 is rigidly secured by means of screws 134 or other suitable means to an elevator 135 which is slidable between a lowered first position, (whereat jaw 131 assumes a cassette-engaging position with layer 132 in planar contact with the top of cassette 20 as shown in FIG. 5) and an elevated second position as illustrated in FIG. 6 (whereat jaw 131 including layer 132 are moved upward to a cassette-disengaging position as shown in FIG. 6). Elevator 135 moves between at least the aforementioned first and second positions along an inclined path defined by a low friction elevator track 137 which is disposed partially along opposed walls of a recess formed in body 101 and partially along opposite sides of elevator 135. Elevator track 137 defines an angle $\theta$ with respect to the lower surface of layer 13 and lower shelf 129 so that throughout its travel, jaw 131 remains parallel to the upper surface of shelf 129 in order to permit the selective clamping and releasing of a cassette 20 as elevator 125 moves jaw 131 between its cassette-engaging and cassette-disengaging positions as shown in FIGS. 5 and 6, respectively. In the preferred embodiment, $\theta$ is about twenty (20) degrees.

In order to effect the desired self-locking condition, elevator 135 should be freely movable with a minimum of friction along the path defined by track 137, but should have an absolute minimum of play in other directions. It is also important that $\mu_s$ and $\theta$ be selected such that:

$$\text{TAN } \theta < \mu_s. \qquad \text{EQUATION 1}$$

As can best be seen with reference to FIG. 1, a pair of springs 138a and 138b compressively disposed between the rear of body 101 and elevator 135 normally bias elevator 135 toward its second position so that jaw 131 normally assumes its cassette-engaging position as illustrated in FIG. 5. The combined bias force exerted by springs 138a and 138b should be selected great enough to permit jaw 131 to grip cassette 20 securely when jaw 131 is in its cassette-engaging position, but small enough that the bias force can be overcome by the force transmitted to the elevator 135 in the opposing direction by the lever which will now be described.

A lever 141 is pivotably mounted to the underside of body 101 at a pivot point 143 as illustrated in FIG. 4. A cam follower 145 extends downwardly from one end of lever 141 and is free to travel back and forth along an arcuate slot 147 formed in the underside of body 101. The other end of lever 141 includes an upward projection 148 which engages a recess 149 located in the underside of elevator 135. Springs 138a and 138b transmitted through elevator 135 act to forceably bias lever 141 to the leftward position as shown in FIG. 4 (i.e., in the −x direction in FIG. 1).

When gripper 100 is positioned on track 80 just forward (−y direction) of home position 102, cam follower 145 engages the second portion 89 of the cam surface defined by track 80 where it remains as gripper 100 is retracted in the +y direction past the one-way gate defined by leaf spring 91. Thereafter, when the gripper 100 is driven forward to window 18, cam follower 145 will engage the opposite side of leaf spring 191 which will prevent it from returning along the path taken during its retraction. Instead, as gripper 100 is moved back toward window 18, leaf spring 91 forces cam follower 145 to move in the +x direction so that it then engages the first portion 88 of the cam surface. As it does so, projection 148 moves with a component in the +x direction. This causes elevator 135 to move upwardly and in the +y direction along elevator track 137 to its first position thus moving jaw 131 to its cassette-disengaging position as illustrated in FIG. 6.

As noted previously, the overall operation of apparatus 15 is governed by controller 30 which comprises a conventionally configured microprocessor such as the Motorola MC6HC811 which includes memory for storing a software program and has an array of I/O ports. Separate ones of the I/O ports are connected by way of suitable buffers and/or optical isolators to entry sensor 26, guide home limit switch 66, eject pushbutton 23, cassette present sensing element 108, cassette present light 24, gripper home limit switch 106, as well as to encoder 127, a "grid home" sensor (not shown) and grid driver 33. Others are connected to a motor driver such as a conventionally configured Motorola part number MPM3002. The outputs of the motor driver comprise two lines which are capable of supplying a D.C. current, whose magnitude and polarity can be changed by the microprocessor in order to select a particular driving speed and direction for either of the motors 52 and 120. In order to avoid the need for a separate motor driver for each motor, the output of the motor driver is selectively switched to either the guide motor 52 or the gripper motor 120 by means of a relay, whose operating coil is controlled by a motor select output of the microprocessor.

Having described the structure of controller 30 and its connections to the various electrical components of apparatus 15, the operation of apparatus 15 will now be described with reference to the stored software program executed by controller 30. This description will be carried out with reference to the simplified flowcharts of FIGS. 8 through 12 inclusive. Those desiring further information concerning the software program are referred to the source code listing contained in Appendix I which forms a part of this patent document.

Figure 8:
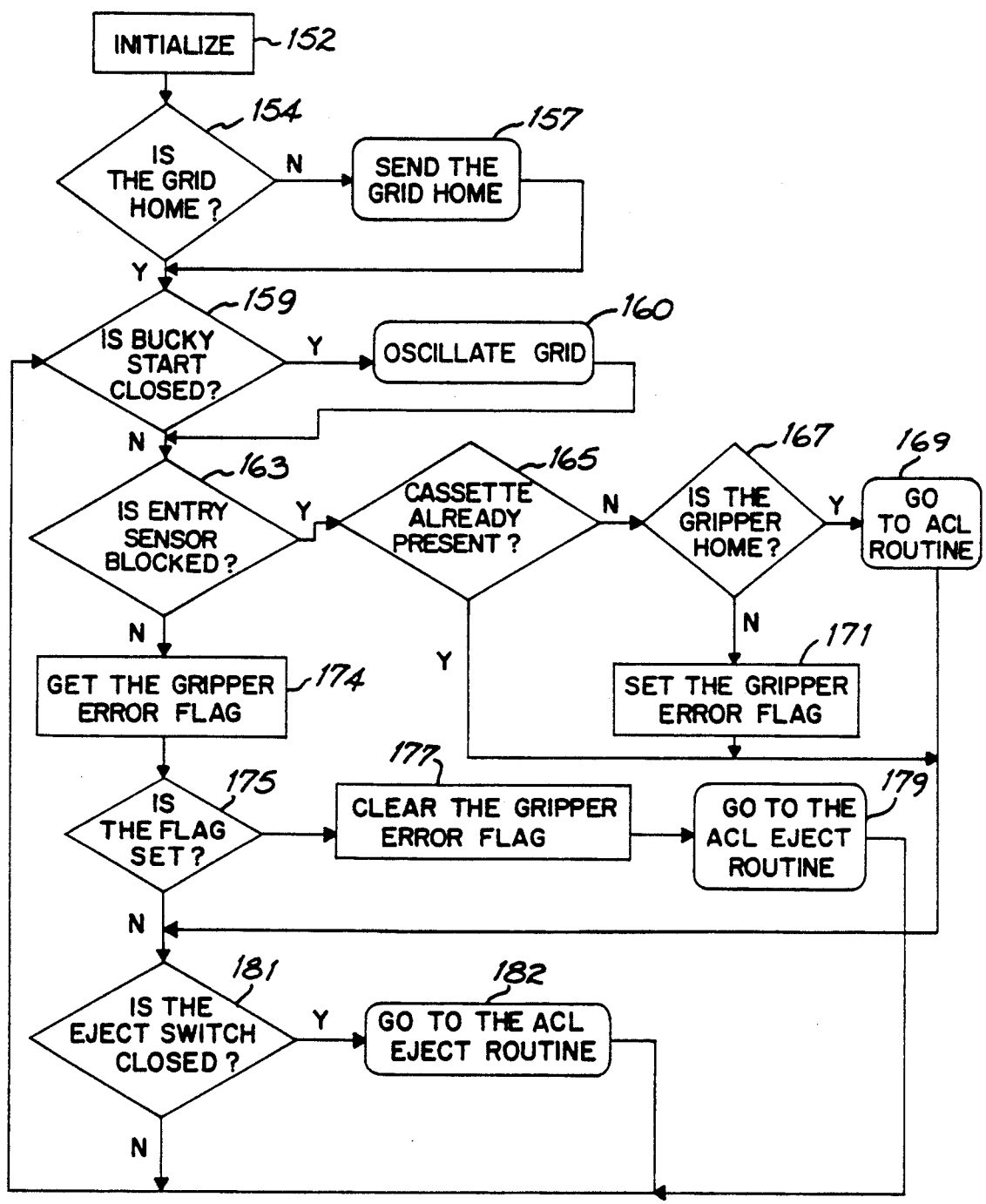

In operation, controller 30 governs the movements of guides 45 and 46 as well as gripper assembly 100 in accordance with a stored software program having a main loop which will now be described with reference to FIG. 8. Upon power up, all I/O ports and registers are initialized at 152. Then, at 154, the microprocessor interrogates the status of the "grid home" sensor to determine whether the antiscatter grid is in its home position. If not, controller 30 executes, at 157, a routine to send the grid home by transmitting appropriate commands via electrical connections 38 effective to cause grid driver 33 to move the grid to its home position. Thereafter, controller 30 awaits closure of a Bucky start switch (not shown) which causes an optically isolated start signal 158 to be generated and transmitted to the microprocessor. If the Bucky start switch is closed, an oscillate grid routine 160 is executed. If the Bucky start switch is not closed or upon completion of the oscillate grid routine 160, the status of entry sensor 26 is checked at 163. If the infra-red beam 28 is blocked by a cassette 20, a check is made at 165 of the register whose status controls the cassette-present light 24. If a cassette 20 is already present inside apparatus 15, program flow skips to 181 where the status of eject switch 23 is checked. If the eject switch has not been closed, flow simply returns to block 159. If the eject switch has been closed, controller 30 executes an ACL EJECT routine (which will be described below with reference to FIG. 10) before returning to block 159. On the other hand, if the check at 155 determined that no cassette 20 was already present within apparatus 15, the status of the gripper home limit switch 106 is checked to determine whether the gripper is present at its home location 102. If so, an ACL routine 169 (which will be described in further detail with reference to FIGS. 9A, 9B and 9C) is executed, whereupon flow proceeds to block 181. If no cassette is already present within apparatus 15 but check 167 reveals that gripper 100 is not at home position 102, there may have been an interruption of the power to controller 30 in the midst of a previous operating cycle. To account for this condition, the microprocessor sets a software "gripper error" flag at 171 and flow proceeds to block 181.

If the check at block 163 reveals that entry sensor 26 is not interrupted by a cassette 20, the gripper error flag is fetched at 174 and its status checked at block 175. If the gripper error flag is not set, no previous power interruption has occurred and flow proceeds to block 181. Otherwise, the gripper error flag is cleared at 177 and the ACL EJECT routine is entered from 179. Upon completion of the ACL EJECT routine, program flow is redirected to block 159. At 181 the status of eject switch 23 is checked and if closed, the ACL EJECT routine entered from block 182. If eject switch 23 is not closed, flow is redirected immediately to block 159 without first executing the ACL EJECT routine. Controller 30 continuously runs through the main loop as described so long as power is applied to apparatus 15.

Figure 9A:
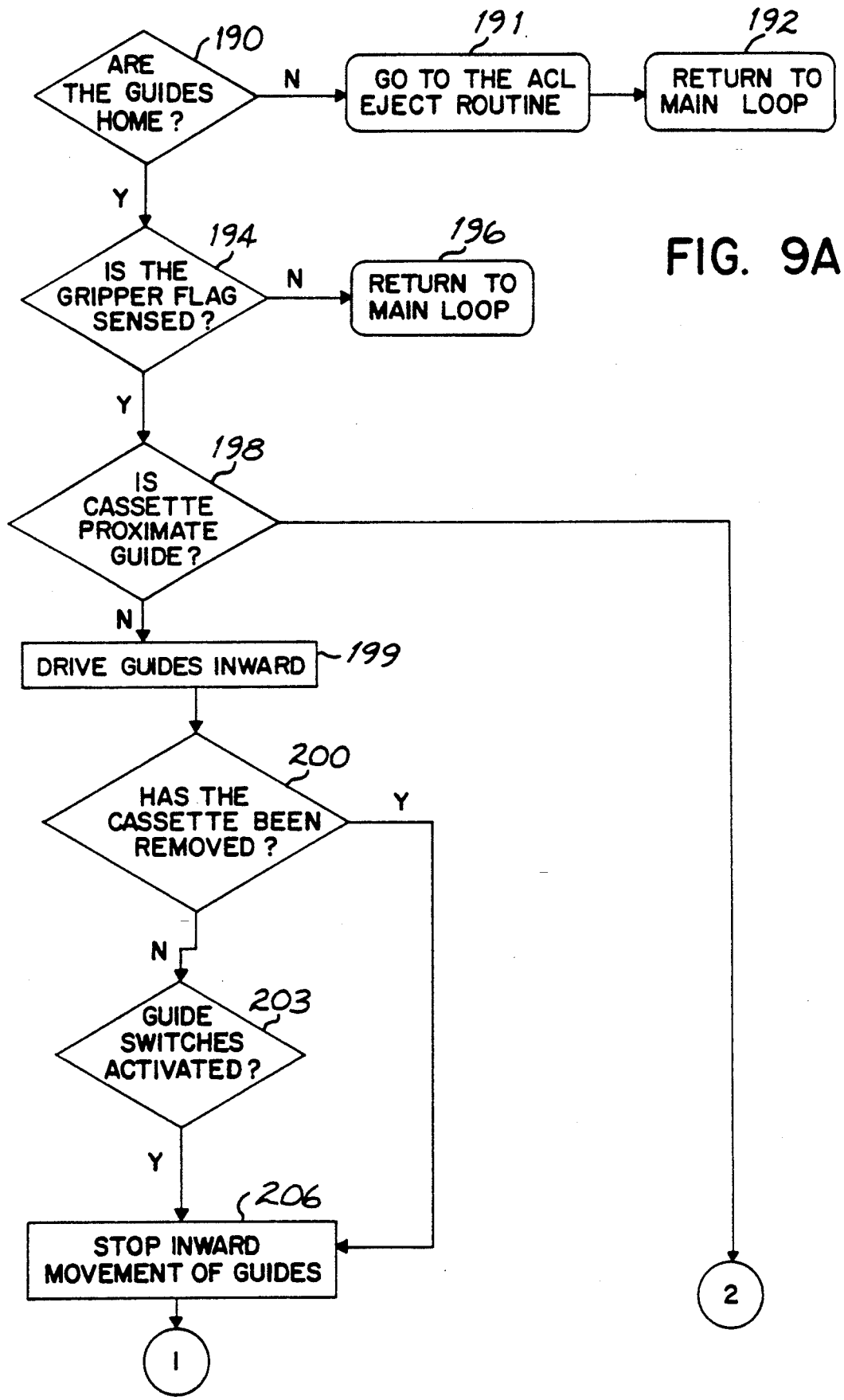
FIGS. 9A, 9B and 9C illustrate the "ACL" (automatic cassette load) routine.

The functions of loading and bi-directionally centering a cassette 20 are governed principally by the ACL routine which will now be described with principal reference to FIGS. 9A, 9B and 9C.

Upon entry of the ACL routine, the status of the signal transmitted to controller 30 from the "guide home" limit switch 66 is checked to determine whether the guides are in their home position as shown in FIG. 1. If not, flow proceeds to the ACL eject routine at 192 and then back to the main loop at 192. If guides 45 and 46 are in their home positions, the positions of the various movable elements of apparatus 15 will be substantially as illustrated in FIG. 1 at the outset of operation. Upon insertion of a cassette 20, entry sensor 26 will send a signal to controller 30 indicating that a cassette 20 blocks entry position 29a. Further insertion of the cassette 20 into window 18 in the +y direction will cause its leading edge to abut the cassette-contacting surface 113 of member 110. This will cause member 110 to move same in the +y direction as springs 115 and 116 are overcome thereby assuming the position illustrated in FIG. 5. In that position, the flag plate 114 will be disposed in its active position in front of sensing element 108 causing sensing element 108 to generate and transmit to controller 30 a signal indicating the presence of a cassette in grippable proximity to gripper assembly 100. If that signal, which sets the gripper flag referred to at 194 is not sensed, flow returns to the main loop at 196. Otherwise, at 198, the status of guide limit switches 70 and 71 are checked at 198 to determine whether the side portions of cassette 20 are both engaged with their respective guides. If so, flow proceeds to block 211 of FIG. 9B indicating that the guides already firmly engage the sides of the cassette 20. Otherwise, flow proceeds to block 199 whereupon guide motor 52 is energized in a sense appropriate to drive guides 45 and 46 inward in the +x and −x directions respectively.

During the movement of guides 45 and 46, checks are made of the status of entry sensor 26 as well as sensing element 108 to determine whether the cassette 20 has been removed. These tests are indicated at block 200. If the cassette has been removed, flow proceeds to block 206 whereupon controller 30 deenergizes guide motor 52 to stop the inward movement of guides 45 and 46. Otherwise, the inward movement of guides 45 and 46 continues as the status of guide limit switches 70 and 71 are checked at block 203. Once both guide limit switches 70 and 71 close indicating that guides 45 and 46 are in firm engagement with the sides of cassette 20, controller 30 stops the inward movement of guides 45 and 46 as indicated at block 206.

Figure 9B:
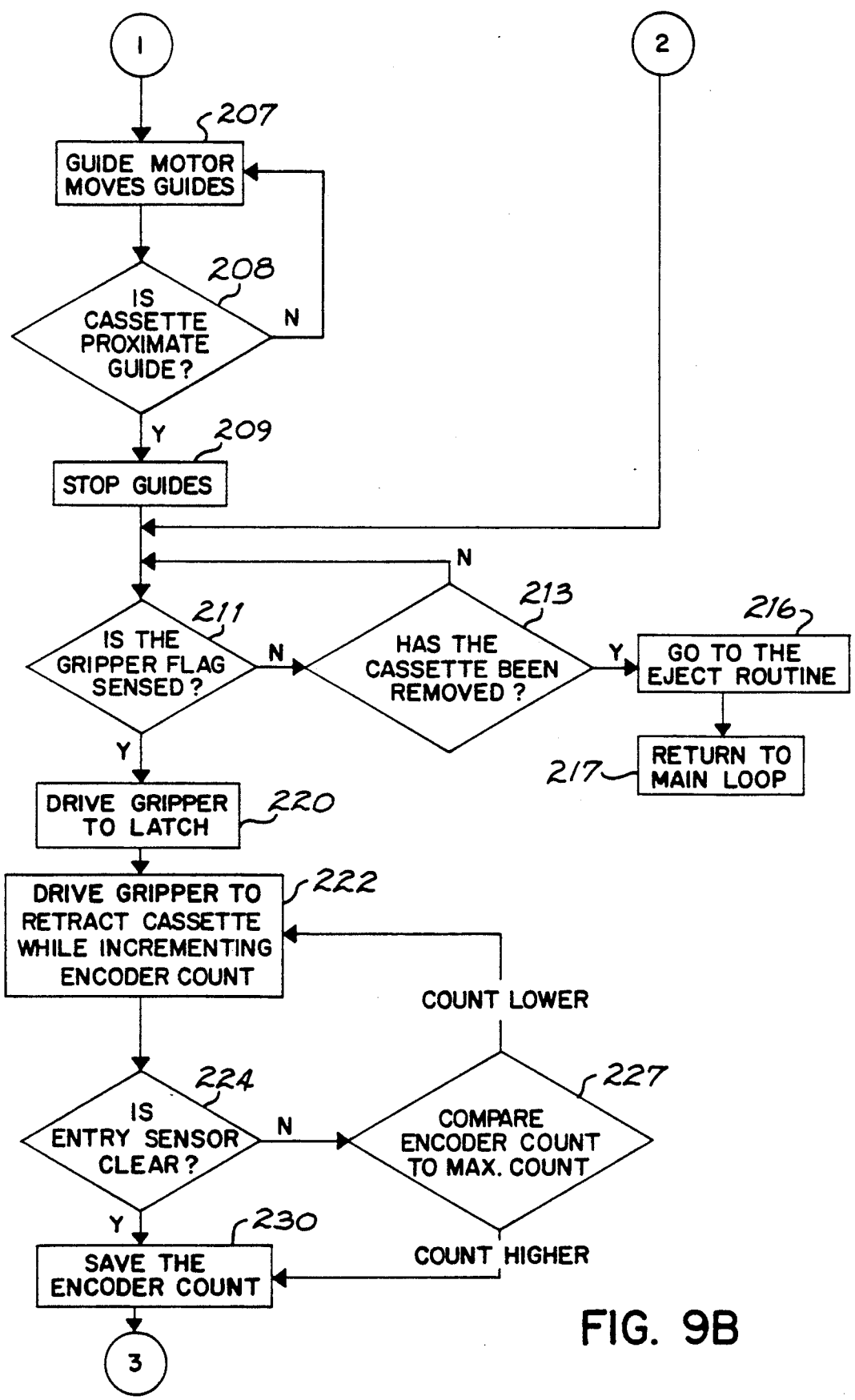
Figure 9C:
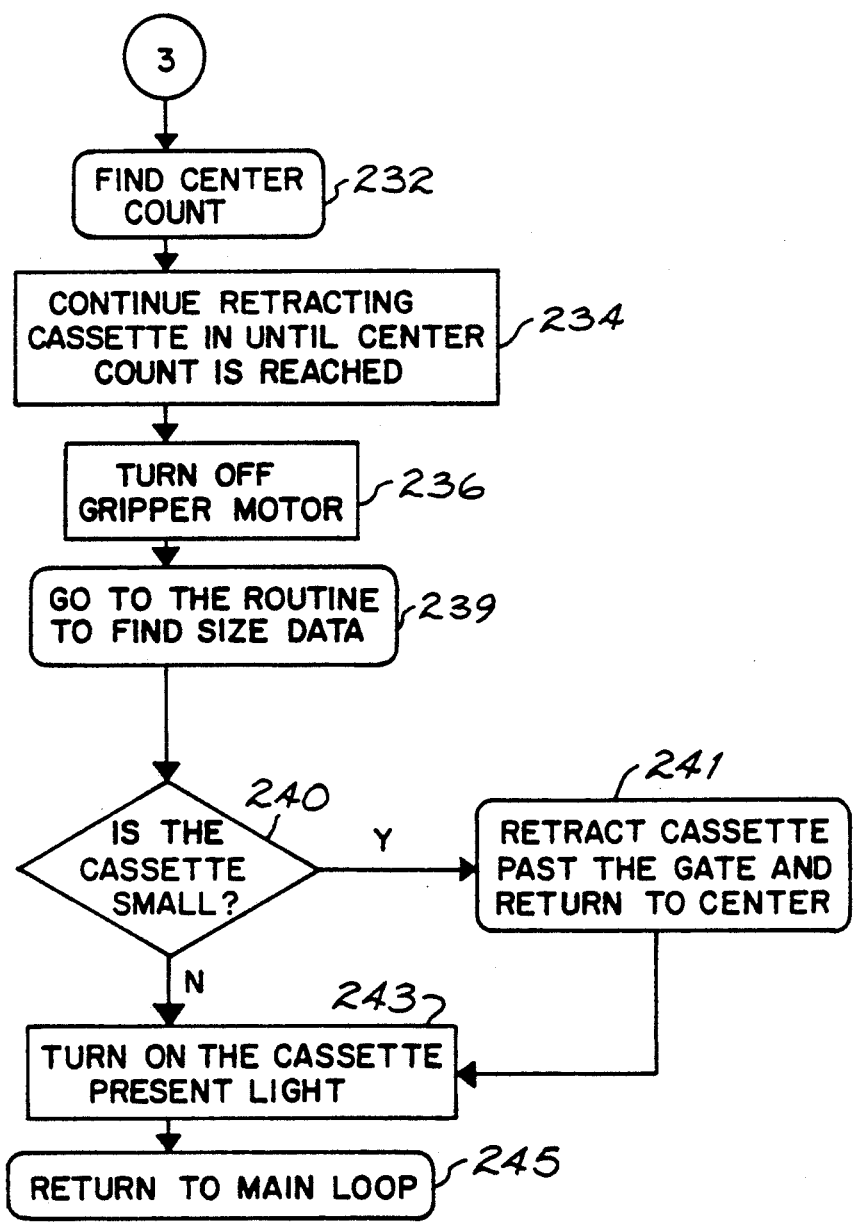

Proceeding now with the description of FIG. 9B, the guide motor 52 is reversed at block 207 causing the guides to move slightly back toward their home positions until the S1 and S2 of the cassette are in a somewhat looser desired proximity of guides 45 and 46 as determined at 208 by again checking the status of switches 70 and 71. The desired proximity is reached when switches 70 and 71 both open. This serves to ensure that guides 45 and 46 do not unduly bind cassette 20 so as to interfere with its being moved by gripper 100. It should be appreciated that due to the fact that guides 45 and 46 move equidistantly with respect to axis 50, their inward movement serves to mechanically center cassette 20 about axis 50 such that equal portions of the cassette 20 as measured in the x direction lie on either side of axis 50.

Following block 209, the status of sensing element 10 is again checked at 211 to determine whether the leading edge L of cassette 20 has moved flag plate 114 to its active position. If not, the status of entry sensor 26 is checked at 213 to determine whether the cassette 20 has been withdrawn out of window 18 past entry point 29a. If not, the program loops repeatedly back to block 211 until sensing element 108 indicates that a cassette 20 is in grippable relation to the gripper assembly 100. If the check at 213 reveals that the entry sensor 26 has been cleared, the eject routine (which will be described in further detail with reference to FIG. 10) is entered at 216 and flow returns to the main loop at 217.

Once the check at 211 indicates that a cassette 20 is positioned as illustrated in FIG. 5, controller 30 energizes gripper motor 120 to commence a cassette-loading movement. In the preferred embodiment, the cassette-loading movement includes two distinct phases. The first phase of this movement is a latching movement which is carried out by commanding gripper motor 120 to move gripper assembly 100 forward from its initial home position 102 by a short predetermined distance sufficient to permit the cam follower 145 to move past the second portion 89 of the cam surface. This is most clearly illustrated in FIG. 3 to which reference is now made.

Figure 3:
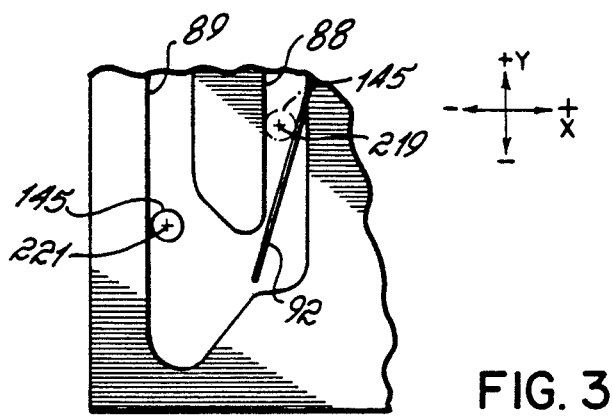
FIG. 3 is an enlarged view of area A of FIG. 2.

When gripper 100 is stopped at home position 102 (FIG. 1), cam follower 145 is located approximately at position 219 shown in FIG. 3. Motor 120 is subsequently energized to move gripper 100 initially a short predetermined distance in the −y direction toward window 18. When gripper 100 is advanced by that predetermined distance, cam follower 145 clears the first portion 88 of the cam surface. The action of springs 138a and 138b then urge elevator 135 to its lowered position. As this occurs, cam follower 145 is displaced in the −x direction until it engages the second portion 89 of the cam surface, thus assuming the latched position 221 shown in FIG. 3. As it does so, its jaw 131 is moved from the cassette-disengaging position (shown and described previously with reference to FIG. 6) to the cassette-engaging position illustrated in FIG. 5. In addition to moving jaw 131 into its cassette-engaging position, the short distance movement of the gripper 100 in the −y direction as just described helps to ensure that the leading edge L of the cassette 20 is in firm engagement with the cassette-contacting surface 113 of member 110 as shown in FIG. 5.

Figure 2:
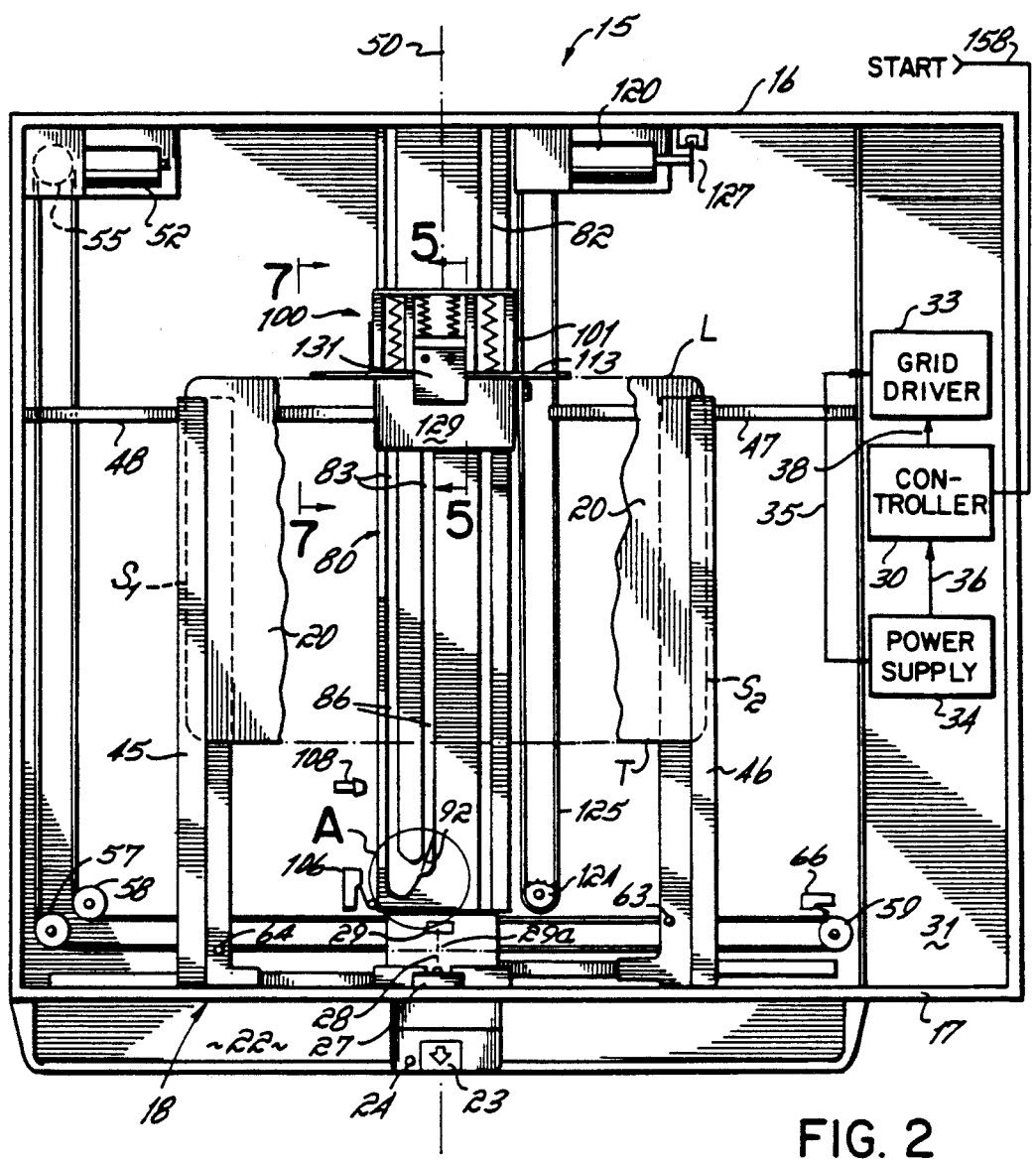
FIG. 2 is a plan view of the apparatus of FIG. 1 showing the gripper holding a cassette at a retracted position and the guides engaged with the side portions of the cassette.

Returning now to consideration of the remainder of FIG. 9B, once the short latching movement of the gripper in the −y direction has been effected, the second and predominant phase of the cassette-loading movement commences. During this phase, gripper motor 120 is reversed causing gripper 100 to move in the +y direction withdrawing cassette 20 further inside housing 16. As indicated at 222, as this motion proceeds, controller 30 increments an "encoder count" register in accordance with pulses received from encoder 127. As it does so, it continually checks at block 224 for the trailing edge of the cassette 20 to clear entry sensor 26. As indicated at 227, controller 30 throughout the remainder of the cassette-loading movement compares the instantaneous encoder count with a stored "max count" value corresponding to the maximum retracted position indicated at 103 in FIG. 1. So long as the present encoder count is lower than the max count value, the maximum travel of the gripper 100 has not yet been reached and the movement of the gripper 100 in the +y direction continues until the entry sensor 26 is cleared by the trailing edge of the cassette as determined at block 224. When entry sensor 26 is cleared, the current encoder count is saved and is later used to make a calculation at block 232 of FIG. 9C. Once the trailing edge of cassette 20 clears entry sensor 26, controller 30 must compute how much farther the cassette must be withdrawn in order to center it according to its size such that the central axis of the cassette as measured in the x direction is positioned at a desired center along axis 50. To do so, the controller 30 at 232 computes a "center count" by subtracting the present encoder count from the stored max count value and dividing the result by two. The resulting "center count" defines the number of additional encoder pulses by which the gripper 100 must be further withdrawn in the +y direction in order to achieve the desired centering. When the present encoder count reaches the computed center count value as indicated at block 234, gripper motor 120 is deenergized as indicated at block 236 to stop gripper 100 at a desired retracted position as illustrated in FIG. 2.

Using a routine called SIZE, which is set forth in Appendix I, controller 30 then calculates the size of cassette 20 as measured along axis 50. It then executes a test at block 240 to determine whether the cassette 20 is so small that the centered position at which it was stopped along track 80 at block 236 is not yet past the +y position of the one-way gate formed by leaf spring 91. If the cassette 20 was stopped at block 236 on the −y side of leaf spring 91, controller 30 at block 241 causes motor 120 to drive the gripper 100 further in the +y direction past leaf spring 91 and then return it an equal distance in the −y direction. At 243 the controller 30 then loads a register effective to turn on the "cassette present" light 24 in order to indicate to an operator that a cassette 20 is loaded within apparatus 15 and returns to the main loop at 245. The cassette 20 is now properly centered inside apparatus 15, whereupon an exposure can then be taken.

Figure 10:
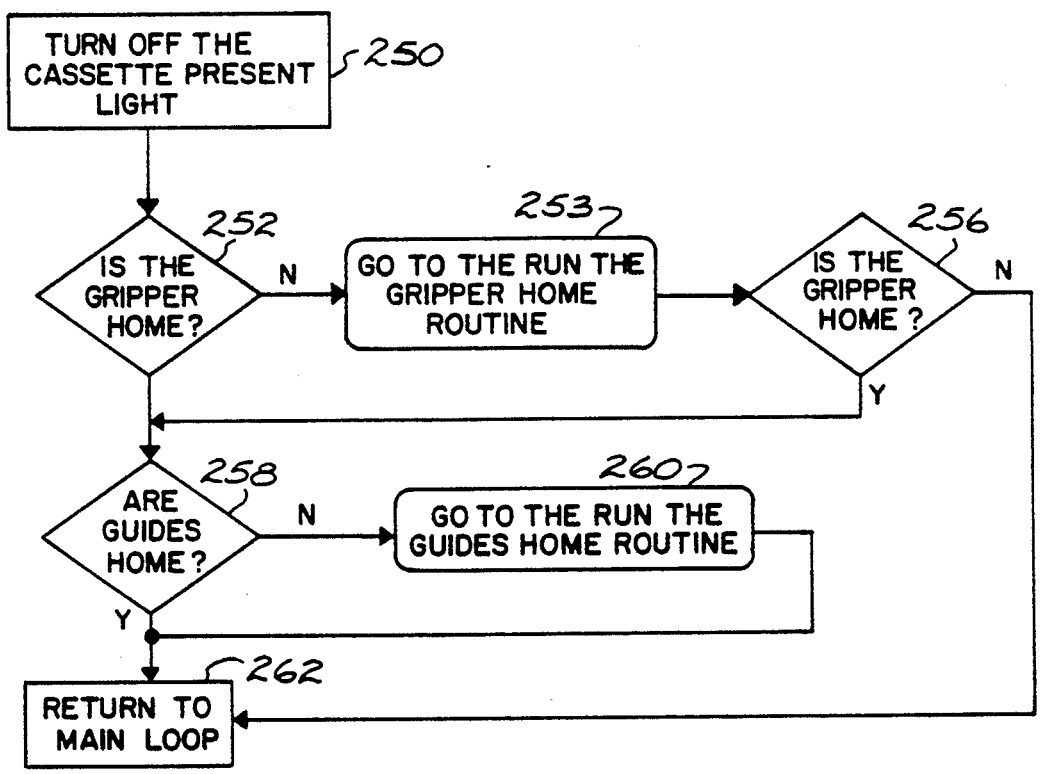

FIG. 10 illustrates the ACL EJECT routine which commences in response to the pressing of eject pushbutton 23 or the receipt by controller 30 of an eject signal generated by the x-ray machine. At block 250 cassette present light 24 is first turned off. At 252 the status of gripper home limit switch 106 is interrogated to determine whether the gripper 100 is in its home position 102. If not, the RUN THE GRIPPER HOME routine is entered at 253. At the completion of the RUN THE GRIPPER HOME routine, a check is made at 256 to determine once more if the gripper 100 is at its home position 102. If not, the program returns to the main loop. If it is determined that the gripper 100 is at home, a check is made at 258 to determine whether the guides 45 and 46 are at their respective home positions. If not, the RUN THE GUIDES HOME routine is entered at 260. Otherwise, flow proceeds directly to the main loop from block 262.

Figure 11A:
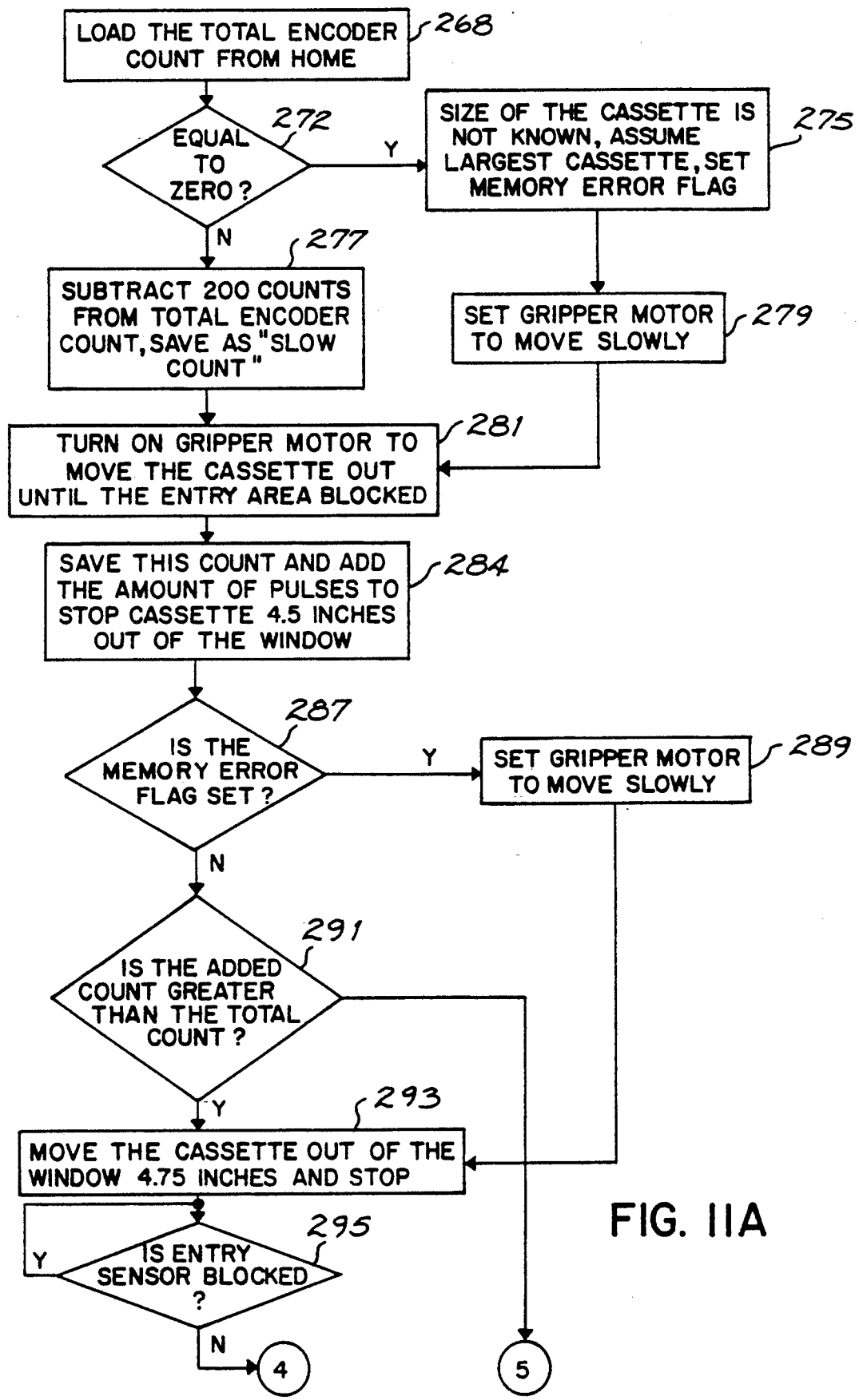
FIGS. 11A and 11B together illustrate the "RUN THE GRIPPER HOME" routine.
Figure 11B:
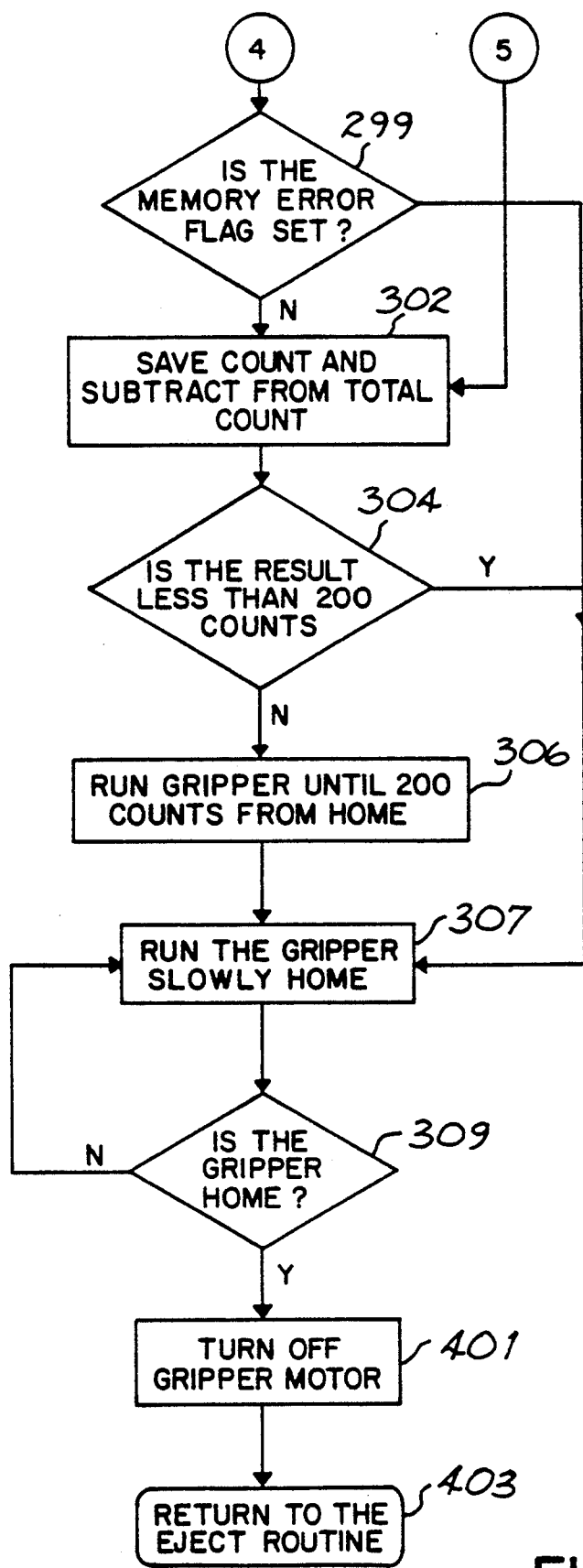

The RUN THE GRIPPER HOME routine, which will now be described with reference to FIGS. 11A and 11B, operates to carry out a cassette-ejecting movement in which the gripper 100 is moved back toward window 18 and then stopped so as to present a portion of cassette 20 extending outside window 18 so that an operator can readily grasp and remove the cassette. If the cassette 20 is small enough, gripper 100 can be run completely to the home position before stopping. On the other hand, it the cassette 20 is a large one, as measured along the y axis, driving the gripper 100 all the way to its home position 102 before stopping it could result in the cassette 20 being precariously balanced or even falling out of window 18. Accordingly, the RUN THE GRIPPER HOME routine determines the stopping point of the gripper 100 based on the size of the cassette 20.

At block 268, the controller 30 fetches the total encoder count accumulated since the gripper 100 was last at its home position. At 272 controller 30 determines whether that count is equal to zero. If so, there has been an intervening power interruption and the size of the cassette 20 within apparatus 15 is not known by controller 30. In that event, as a safety measure, a "memory error" flag is set at block 275 and subsequently, in block 279 the gripper motor 120 is set to move slowly and program flow proceeds to block 281 which will be described shortly.

If the test at block 272 reveals the count not equal to zero, a "slow count" is computed by subtracting a predetermined number of counts from the total encoder count. The "slow count" represents the last portion of travel along axis 50 along which it is desired to advance the gripper 100 slowly rather than advance it at its normal rapid rate. At 281 the gripper motor 120 is energized to drive the gripper assembly 100 in the −y direction until entry sensor 106 is blocked by the trailing edge of cassette 20. At 284 the encoder count at the time entry sensor 26 was blocked is saved and added to an appropriate amount of pulses effective to stop the cassette at an ejection point such that less than about half and preferably only about 4.5 inches of the cassette 20 as measured along axis 50 extends unsupported outside window 18.

Next, a check is made of the memory error flag to determine whether any intervening power failures have occurred. If so, the gripper motor 120 is set to move slowly at 289, whereupon flow skips to block 293 which will soon be described. If the memory error flag was not set, a check is made at block 291 to determine whether the added count computed at block 284 is greater than the total count. If not, flow skips ahead to block 302. Otherwise, gripper motor 120 is driven in the −y direction until a portion, for example, 4.75 inches of cassette 20 extends from window 18 whereupon gripper motor 120 is stopped. The movement commanded by block 293 takes place at a rapid rate unless block 293 has been entered by way of block 289 whereupon the movement takes place at a slow rate.

At 295 entry sensor 26 is repeatedly interrogated. Once the sensor 26 is no longer blocked, indicating that the operator has removed the cassette 20, the memory error flag is checked at 299. If the memory error flag has been set, flow advances to block 307 to be described below. Otherwise, flow proceeds to block 302 where the present encoder count at the time the entry sensor is blocked at 295 is saved and subtracted from the total encoder count. If the result is not less than a predetermined distance, such as 512 counts, gripper motor 120 is energized to run the gripper 100 rapidly toward its home position until it is two hundred (200) counts away. Flow then proceeds to block 307 in which the gripper 100 is advanced at a slow rate until interrogation of the gripper home limit switch 106 at block 309 indicates that the gripper 100 is home. By moving the gripper 100 slowly during the final portion of its travel home, the possibility of the gripper overrunning home position 102 is avoided. Once gripper 100 is home, gripper motor 120 is deenergized at block 401 and, at block 403 flow returns to the eject routine previously described with reference to FIG. 10.

Figure 12:
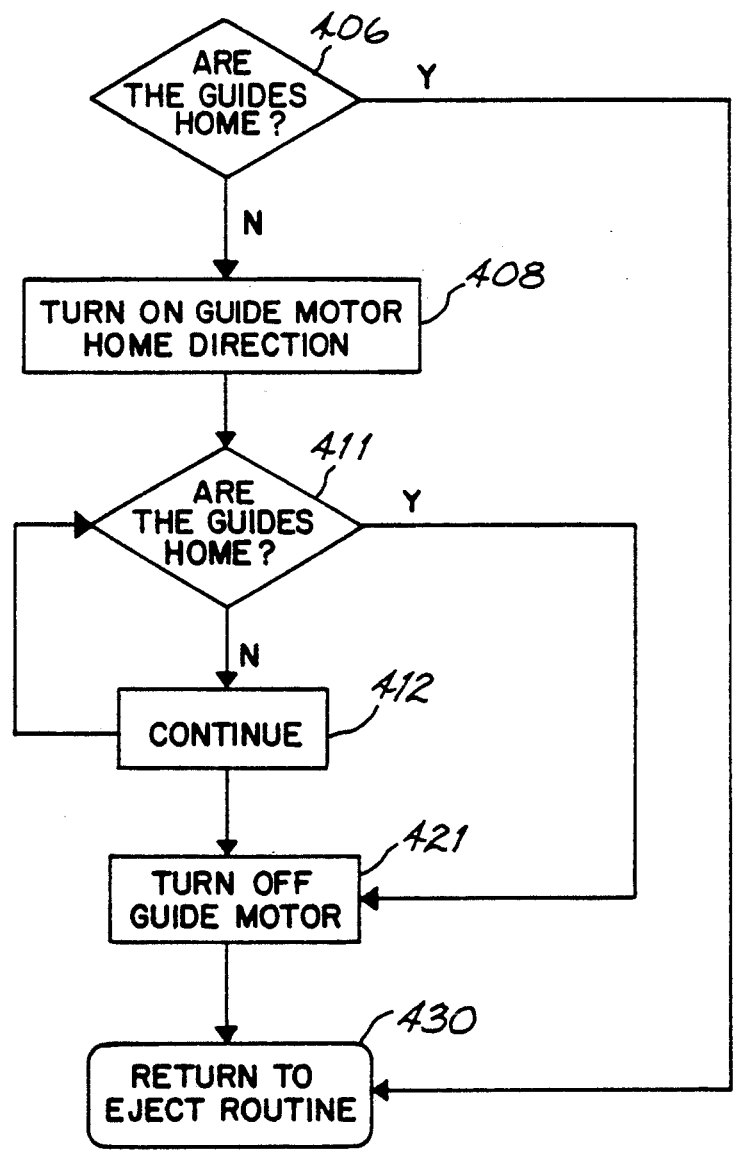

Referring now to FIG. 12, the RUN THE GUIDES HOME routine commences with a check of the status of guide home limit switch 66 to determine whether the guides 45 and 46 are at their home position as illustrated in FIG. 1. If so, flow skips ahead to block 430 which returns to the ACL EJECT routine. If the guides 45 and 46 are not home, guide motor 52 is energized at block 408 in a sense appropriate to drive sprocket 55 clockwise, thereby moving guides 45 and 46 toward their home positions as shown in FIG. 1. In blocks 411 and 412, the driving of the guides 45 and 46 toward their home positions continues until the guide home limit switch 66 indicates that the guides are home. Then the guide motor 52 is turned off and flow is redirected at block 430 to the eject routine.

While the apparatus described herein constitutes a preferred embodiment of the invention, it is to be understood that the invention is not limited to the particular form described since, in light of the present disclosure, those skilled in the art will readily recognize changes which can be made thereto without departing from the scope of the invention as particularly pointed out and distinctly claimed in the appended claims including all legal equivalents.

APPENDIX I

```
;  8000 ACL
;  OCTOBER 31,1990
;  VERSION DV1.40

***INTERNAL REGISTERS

PADR     EQU    00H         PORT A DATA REGISTER
PIOC     EQU    02H         PARALLEL I/O CONTROL REGISTER
PCDR     EQU    03H         PORT C DATA REGISTER
PBDR     EQU    04H         OUTPUT PORT B

CDDR     EQU    07H         DATA DIRECTION PORT C
PDDR     EQU    08H         I/O PORT D
DDRD     EQU    09H         DATA DIRECTION PORT D
PORTE    EQU    0AH         INPUT PORT E
CFORC    EQU    0BH         COMPARE FORCE REGISTER
OC1M     EQU    0CH         OC1 ACTION MASK REGISTER
OC1D     EQU    0DH         OC1 ACTION DATA REGISTER

PTDR     EQU    0EH         HI BYTE TIMER COUNTER REGISTER
LTCNT    EQU    0FH         LOW BYTE TIMER COUNTER REGISTER

HTIC1    EQU    10H         HI BYTE INPUT CAPTURE REG. 1
LTIC1    EQU    11H         LO BYTE INPUT CAPTURE REG. 1
HTIC2    EQU    12H         HI BYTE INPUT CAPTURE REG. 2
LTIC2    EQU    13H         LO BYTE INPUT CAPTURE REG. 2
HTIC3    EQU    14H         HI BYTE INPUT CAPTURE REG. 3
LTIC3    EQU    15H         LO BYTE INPUT CAPTURE REG. 3

HTOC1    EQU    16H         HI BYTE OUTPUT COMPARE REG. 1
LTOC1    EQU    17H         LO BYTE OUTPUT COMPARE REG. 1
HTOC2    EQU    18H         HI BYTE OUTPUT COMPARE REG. 2
LTOC2    EQU    19H         LO BYTE OUTPUT COMPARE REG. 2
HTOC3    EQU    1AH         HI BYTE OUTPUT COMPARE REG. 3
LTOC3    EQU    1BH         LO BYTE OUTPUT COMPARE REG. 3
HTOC4    EQU    1CH         HI BYTE OUTPUT COMPARE REG. 4
LTOC4    EQU    1DH         LO BYTE OUTPUT COMPARE REG. 4

HTI4O5   EQU    1EH         OUTPUT COMPARE REG. 5
LTI4O5   EQU    1FH         OUTPUT 5/ INPUT 4 REG.

TCTL1    EQU    20H         TIMER CONTROL REGISTER 1
TMSK1    EQU    22H         TIMER INTERRUPT MASK REG. 1
TFLG1    EQU    23H         TIMER INTERRUPT FLAG REG. 1

TCTL2    EQU    21H         TIMER CONTROL REGISTER 2
TMSK2    EQU    24H         TIMER INTERRUPT MASK REG. 2
TFLG2    EQU    25H         TIMER INTERRUPT FLAG REG. 2

PACTL    EQU    26H         PULSE ACCUMULATOR CONTROL REG.
PACNT    EQU    27H         PULSE ACCUMULATOR COUNT REG.

SPCR     EQU    28H         SPI CONTROL REGISTER
SPSR     EQU    29H         SPI STATUS REGISTER
SPDR     EQU    2AH         SPI DATA REGISTER

BAUD     EQU    2BH         SCI BAUD RATE CONTROL
SCCR1    EQU    2CH         SCI CONTROL REGISTER 1
SCCR2    EQU    2DH         SCI CONTROL REGISTER 2
SCSR     EQU    2EH         SCI STATUS REGISTER
SCDR     EQU    2FH         SCI DATA READ / WRITE REGISTER

ADCTL    EQU    30H         A/D CONTROL REGISTER
ADR1     EQU    31H         A/D RESULT REGISTER 1
ADR2     EQU    32H         A/D RESULT REGISTER 2
ADR3     EQU    33H         A/D RESULT REGISTER 3
ADR4     EQU    34H         A/D RESULT REGISTER 4
```

```
BPROT    EQU   1035H       EEPROM BLOCK PROTECT REGISTER
OPTION   EQU   39H         SYSTEM CONFIGURATION OPTIONS
COPRST   EQU   3AH         ARM/RESET COP TIMER CIR.
PPROG    EQU   3BH         EEPROM PROG CONTROL REG.
HPRIO    EQU   3CH         HIGHEST PRIORITY INTERRUPTS
INIT     EQU   103DH     , RAM AND I/O MAPPING
CONFIG   EQU   3FH         COP,ROM AND EEPROM ENABLES

*** INTERRUPT AND RESET VECTORS

ORG OFFD6H

VSCI     FDB NONE          SCI SERIAL SYSTEM INTERRUPT
VSPI     FDB NONE          SPI SERIAL PORT INTERRUPT
PAEDGE   FDB NONE          PULSE ACC. INPUT EDGE INTERRUPT
PAFLOW   FDB ENCODE        PULSE ACC. OVERFLOW INTERRUPT
TFLOW    FDB NONE          TIMER OVERFLOW INTERRUPT
IC4OC5   FDB NONE          INPUT CAPTURE 4 OUTPUT COMPARE 5
VTOC4    FDB FLAG_TI       TIMER OUTPUT COMPARE #4
VTOC3    FDB NONE          TIMER OUTPUT COMPARE #3
VTOC2    FDB NONE          TIMER OUTPUT COMPARE #2
VTOC1    FDB PWM_OSC       TIMER OUTPUT COMPARE #1
VTIC3    FDB F_CODE        TIMER INPUT CAPTURE #3
VTIC2    FDB NONE          TIMER INPUT CAPTURE #2
VTIC1    FDB NONE          TIMER INPUT CAPTURE #1
REAL     FDB NONE          REAL TIMER INTERRUPT
EIRQ     FDB NONE          EXTERNAL INTERRUPT PIN
XIRQ     FDB NONE          XIRQ INTERRUPT PIN
ISWI     FDB NONE          SOFTWARE INTERRUPT
TRAP     FDB WAT_DOG       ILLEGAL OPCODE TRAP
FAILDOG  FDB WAT_DOG       COP FAILURE ( RESET )
CLKFAIL  FDB WAT_DOG       COP CLOCK FAIL ( RESET )
RESET    FDB START         POWER ON RESET VECTOR

*** I/O PORT DEFINITIONS

*** PORT A

FLAG_IN      EQU 1         34 BUCKY ENCODER FLAG INPUT
GRIP_HM      EQU 2         33 GRIPPER HOME INPUT
HOMSW        EQU 4         32 HOME LIMIT SWITCH INPUT
GRIP_SWO     EQU 8         31 OPTIONAL GRIPPER SWITCH
BU_ACL_S     EQU 16        30 BUCKY/ACL RELAY MOTOR SELECT OUTPUT
DRFOW        EQU 32        29 DRIVE FORWARD OUTPUT
DRREV        EQU 64        28 DRIVE REVERSE OUTPUT
EN_PULSE     EQU 128       27 ACL ENCODER INPUT

*** PORT B

CASS_PR      EQU 1         42 CASSETTE PRESENT LED AND RELAY
GR_CH_S      EQU 2         41 GRIPPER/CHANNEL MOTOR SELECT
RAY          EQU 4         40 XRAY RELAY OUTPUT
DSW_SEL      EQU 8         39 DIP SWITCH SELECT
EX_CNT       EQU 16        38 EXTERNAL COUNTER OUTPUT
WAT_LIT      EQU 32        37 PROCESSOR STATUS LED
SPARE_1      EQU 64        36 SPARE OUTPUT 1
SPARE_2      EQU 128       35 SPARE OUTPUT 2

*** PORT C

TIM_EJ       EQU 1          9 TIMED EJECT INPUT
GRIP_SW      EQU 2         10 GRIPPER SWITCH INPUT
CHAN_HOM     EQU 4         11 CHANNEL HOME INPUT
EJECT_SW     EQU 8 ,       12 EJECT SWITCH INPUT
PB4          EQU 16        13 DIP 4 & 8
PB5          EQU 32        14 DIP 3 & 7
PB6          EQU 64        15 DIP 2 & 6
PB7          EQU 128       16 DIP 1 & 5
```

```
SET_C           EQU 00000000B    DATA DIRECTION FOR PORT C

*** PODT D

H_RXD           EQU 1            20 ACL RECEIVE DATA
H_TXD           EQU 2            21 ACL TRANSMIT DATA
MISO            EQU 4            22 SPI MASTER IN SLAVE OUT
MOSI            EQU 8            23 SPI MASTER OUT SLAVE IN
SCK             EQU 16           24 SPI CLOCK
SS              EQU 32           25 SPI SLAVE SELECT

SET_D           EQU 00111000B    DATA DIRECTION FOR PORT D
***                              SS,SCK,MOSI, ALL ARE OUTPUTS

*** PORT E

FV_IN           EQU 1            43 FREQUENCY TO VOLTAGE IN
SP_AD1          EQU 2            45 SPARE A/D INPUT 1
SP_AD2          EQU 4            47 SPARE A/D INPUT 2
SP_AD3          EQU 8            49 SPARE A/D INPUT 3
IN_BL_S         EQU 16           44 INPUT BLOCKED SENSOR INPUT
REEJ            EQU 32           46 REMOTE EJECT OPTION INPUT
CHAN_SET        EQU 64           48 CHANNEL SET
INSW            EQU 128          50 BUCKY START SWITCH

*** THE RUN_CON REGISTER IS USED FOR RUN TIME CONTROL FLAGS

OUT             EQU 1            DRIVE COMPLETELY EXTENDED FLAG
HOM_CON         EQU 2            1=HOME SENSOR CLOSED  0=HOME SENSOR OPEN
NU2             EQU 4            NOT USED
NU3             EQU 8            NOT USED
NU4             EQU 16           NOT USED
NU5             EQU 32           NOT USED
NU6             EQU 64           NOT USED
NU7             EQU 128          NOT USED

*** PWM FREQUENCY VALUE

FREQ1           EQU 120          VALUE FOR 12KHz
FREQ2           EQU 240          VALUE FOR 6KHz

*** TIME BETWEEN ENCODER PULSES FOR SET MODES OF OPERATION

PAR_LO          EQU 30           TIME BETWEEN ENCODER PULSES LO
PAR_HI          EQU 50           TIME BETWEEN ENCODER PULSES HI
SUPER_LO        EQU 9            TIME BETWEEN ENCODER PULSES LO
SUPER_HI        EQU 18           TIME BETWEEN ENCODER PULSES HI

H_DEL           EQU 200
S_VALUE         EQU 50           NUMBER OF PWM OVERFLOWS BEFORE STALL
A_STOP          EQU 40           NUMBER OF CYCLES TO COMPLETE BEFORE STOPPING

*** PWM CONTROL VALUE FOR TIMER FUNCTIONS

FORD            EQU 10110000B    TURN ON REVERSE DRIVE AND TURN OFF FORWARD
REVS            EQU 11100000B    TURN ON FORWARD DRIVE AND TURN OFF REVERSE
POFF            EQU 11110000B    TURN OFF FORWARD AND REVERSE

*** REGISTER CONFIGURATIONS

T1MASK          EQU 01100000B    ENABLE PA6 & PA5
T1DATA          EQU 01100000B    SET BIT PA6 & PA5
TCOMM1          EQU 11110000B    TIMER DISCONNECTED FROM OUTPUT PIN LOGIC

ICMASK          EQU 00000011B    INPUT CAP. BOTH EDGES FOR #3
```

```
TIMSK1   EQU 10010001B        ENABLE NO. 1 INTERRUPT AND INPUT CAP. #3
DEF1SCR  EQU 00000000B        1 START,1 STOP,NO PARITY
DEF2SCR  EQU 00001000B        TRANS. ENABLED, NO REC., INTERRUPTS
DEFBAUD  EQU 00110000B        9600 BAUD RATE
DEFPULS  EQU 01010111B        EVENT COUNTING PULSE ACC.

*** SYSTEM CONFIGURATION REGISTER SET-UP

TIMSK2   EQU 00100000B        ENABLE OVERFLOW**,ENABLE PULSE ACCUMULATOR

PULSET   EQU 01011011B        PULSE ACCUMULATOR SET-UP

V_OPT    EQU 10101011B        SYSTEM CONFIG. OPTIONS REGISTER,ENABLE CLOCK MONITOR(B3

V_COP    EQU 00000000B        ARM/RESET COP TIMER CIRCUITRY

V_PROG   EQU 00000001B        EEPROM PROGRAM CONTROL REGISTER

V_HPRO   EQU 00000000B        HIGHEST PRIORITY I-BIT INT. AND MISC.

V_INIT   EQU 00010000B        RAM & I/O MAPPING REGISTER

TEST1    EQU 00000000B        FACTORY TEST CONTROL REGISTER

V_FIG    EQU 11110001B        COP,ROM,AND EEPROM ENABLES (ENABLE COP)

*** INTERNAL RAM ALLOCATION. MEMORY SPACE RANGE : 1000H - 10FFH

*** BUCKY RAM USAGE

ORG 1000H
ONTIME    RMB 2          VALUE FOR DRIVE PULSE ON TIME
P_UPDAT   RMB 1          PWM UPDATE RATE
LAST      RMB 2          LAST CAPTURED TIME
PULSE     RMB 1          TIME BETWEEN ENCODER PULSES
CAPT      RMB 2          INPUT CAPTURED TIME
GFPOS     RMB 1          CURRENT POSITION OF GRID. (1=.050" MOVEMENT)
POINT     RMB 2          MEMORY POINTER FOR PULSE TIME VALUES
STROKE    RMB 1          SAVES NUMBER OF FLAG ENCODER PULSES PER STROKE
SWITCH    RMB 1          DATA READ FROM DIP SWITCH
PERIOD    RMB 2          VALUE FOR PERIOD OF PWM FREQUENCY
DES_LO    RMB 1          DESIRED TIME BETWEEN FLAG ENCODER PULSES
DES_HI    RMB 1,         DESIRED TIME BETWEEN FLAG ENCODER PULSES
BUC_FRE   RMB 2          CURRENT BUCKY OPERATING FREQUENCY
MIN_SPD   RMB 1          BUCKY MINIMUM SPEED FLAG REGSITER
RAY_STR   RMB 1          EXPOSURE RELAY TURN ON POSITION
RUN_CON   RMB 1          RUN TIME CONTROL FLAGS REGISTER
FIR_STR   RMB 2          FIRST STROKE TIME ( VALUE * 200uS )
EMN       RMB 1          ERROR MESSAGE NUMBER REGISTER
AUTO      RMB 1          AUTO STOP REGISTER
STALL     RMB 1          MOTOR STALL VALUE REGISTER
ECNT      RMB 1          ERROR COUNTER REGISTER

**** ACL RAM USAGE

ENCD_CT   RMB 1          ENCODER COUNT MEMORY LOCATION
GRIP_CT   RMB 1          GPIPPER ENCODER COUNT LOCATION
SPEED     RMB 1          MEMORY FOR SPEED SETTING
DEL_T     RMB 2          DELAY TIME AMOUNT MEMORY
HOME_CT   RMB 2          PULSE COUNT TO GRIPPER  NEARLY HOME
COUNT_I   RMB 2          COUNT TO CENTER CASSETTE IN BUCKY
TSEN_CT   RMB 2          MEMORY FOR COUNT TO THE SENSOR
STOP_CT   RMB 2          MEMORY FOR -8 IN STOP VALUE
STOP_V    RMB 2          MEMORY FOR ACTUAL STOP COUNT VALUE
SL_CT     RMB 2          MEMORY FOR ACTUAL SLOW COUNT VALUE
```

| | | |
|---|---|---|
| CHAN_CT | RMB 2 | CHANNEL ENCODER COUNT MEMORY |
| TEMP_CT | RMB 2 | TEMP STORAG FOR CASSETTE SIZE |
| FULL_CT | RMB 2 | MEMORY FOR FULL COUNT TO HOME |
| CHAN_SZ | RMB 1 | VALUE FOR CASSETTE SIZE (CHANNEL) |
| GRIP_SZ | RMB 1 | VALUE FOR CASSETTE SIZE (GRIP) |
| C_GR_CT | RMB 2 | CALCULATED GRIP COUNT |
| D_FLAG | RMB 1 | MEMORY FOR STORING MOTOR DIRECTION |
| AD_RES | RMB 2 | A TO D RESULT REGISTER (CHANNEL HOME) |
| SPEED_M | RMB 1 | MEMORY FOR SAVING THE LAST ACTUAL SPEED |
| TEMP_M | RMB 2 | TEMPERARY RESULT MEMORY |
| TEMP_X | RMB 2 | TEMPERARY RESULT MEMORY |
| REMAIN | RMB 1 | TEMPERARY REMAINDER MEMORY |
| TEMP_R | RMB 2 | TEMPERARY REMAINDER MEMORY |
| M_ERRR | RMB 1 | FLAG TO DETECT POWER FAILURE |
| AD_CT | RMB 1 | MEMORY TO KEEP TRACK OF 8 CYCLES AVERAGE |
| CDATA | RMB 1 | DATA REGISTER FOR CONVERTING VALUE TO ASCII |
| ADATA | RMB 2 | ASCII DATA TO SEND |
| GR_H_ERR | RMB 1 | GRIPPER NOT HOME ERROR FLAG |
| DATA_M | RMB 1 | MEMORY FOR SAVING DATA IN THE CONVERTION ROUTINE |

\*\*\* PROGRAM STARTS HERE !

\*\*\*INITIALIZE I/O PORTS AND SET UP TIMER PRESCALER

```
        ORG 0F800H
START   CLR BPROT              ENABLE EEPROM FOR ERASE/WRITE OPERATIONS
        LDAA #V_INIT           VALUE TO SET RAM AND I/O
        STAA INIT              SET REGISTER
        LDAA #V_OPT            VALUE TO SET OPTION REGISTER
        STAA OPTION            SET REGISTER
        LDAA #V_COP            VALUE FOR ARM/RESET COP
        STAA COPRST            SET REGISTER
        LDAA #V_PROG           VALUE FOR EEPROM PROGRAMMING
        STAA PPROG             SET REGISTER
        LDAA #V_HPRO           VALUE FOR PRIORITY REGISTER
        STAA HPRIO             SET REGISTER
        LDAA #V_FIG            VALUE TO SET COP,ROM AND EEPROM
        STAA CONFIG

LDAA #TCOMM1           DATA FOR TIMER CONTROL REGISTER
        STAA TCTL1             SET TIMER CONTROL REGISTER
        LDAA #T1MASK           OUTPUT COMPARE TIMER #1 MASK BYTE
        STAA OC1M              TURN ON PA6 AND PA5
        LDAA #T1DATA           DATA FOR OUTPUT HIGH ON COMPARISON
        STAA OC1D              SET DATA REGISTER

LDAA #ICMASK           INPUT CAPTURE TRIGGER CONTROL
        STAA TCTL2             #3 TRIGGERS ON BOTH EDGES

LDAA #TIMSK1           INTERRUPT MASK DATA
        STAA TMSK1             SET INTERRUPT ENABLES
        LDAA #DEF1SCR          DATA FOR SERIAL CONTROL REGISTER
        STAA SCCR1             SET CONTROL REGISTER 1
        LDAA #DEF2SCR          DATA FOR SERIAL CONTROL REGISTER
        STAA SCCR2             SET CONTROL REGISTER 2
        LDAA #DEFBAUD          DATA TO SET BAUD RATE
        STAA BAUD              SET BAUD RATE AT 9600
        LDAA #DEFPULS          DATA TO SET PULSE ACCUMULATOR
        STAA PACTL             SET PULSE ACCUMULATOR
        LDAA #SET_D            DATA DIRECTION FOR PORT D
        STAA DDRD              SET PORT D

LDAA #TIMSK2           SET UP PULSE ACCUMULATOR
        STAA TMSK2             SET INTERRUPT ENABLES
```

```
            LDAA  #20H                  VALUE TO SET PULSE OVERFLOW FLAG
            STAA  TFLG2                 SET TIMER FLAG

LDAA  #01011111B            VALUE TO SET THE SPI CONTROL
            STAA  SPCR                  SET  THE SPI CONTROL

LDS   #10FFH                SET STACK POINTER

*** CLEAR ALL INTERNAL RAM FROM 1000H TO 10FFH

RAM_CLR LDX  #1000H                     BEGINNING OF RAM
CLELOP  CLR  00H,X                      CLEAR LOCATION

INX
            CPX   #10FFH                LOOK FOR STOP POINT
            BNE   CLELOP                BRANCH IF NOT FINISHED

JSR   FRE_12K               SET UP FOR 12KHZ

SSSS     BRSET PORTE,INSW,SSSS          BRANCH IF BUCKY START SWITCH CLOSED

CLI                         ALLOW INTERUPTS

***THIS ROUTINE IS USED TO GENERATE THE CHECKSUM VALUE FOR PROGRAM.

CLRA                        CLEAR A
            CLRB                        CLEAR B
            LDX   #0F800H               LOAD THE FIRST PROGRAM ADDRESS INTO X

LDAB  #26H                  ASCII %
            JSR   TRANS                 SEND TO QDT TO DENOTE CHECKSUM TO FOLLOW

CKSUM    ADDD  00H,X                    ADD DATA IN X MEMORY LOCATION
            INX                         GO TO NEXT MEMORY LOCATION
            CPX   #0FFFFH               HAS THE END OF THE PROGRAM
            BNE   CKSUM

JSR   CONSEND               CONVERT TO ASCII AND SEND FOUR CHARACTERS

*** MAIN PROGRAM LOOP STARTS HERE !

BRCLR PADR,HOMSW,MAIN       BRANCH IF BUCKY HOME

JSR HOME                    SEND BUKCY TO HOME POSITION

MAIN     JSR   KICK                     RESET THE WATCHDOG TIMER

BRCLR PORTE,INSW,ML_2       BRANCH IF BUCKY START SWITCH OPEN

JSR BUCKY                   START BUCKY OPERATION

ML_2     BRCLR PORTE,IN_BL_S,ML_6       BRANCH IF ENTRY WAY BLOCKED
         LDAA  GR_H_ERR                 GET GRIPPER HOME ERROR FLAG
         BEQ   ML_3                     IF FLAG NOT SET CONTINUE TO LOOP

CLR   GR_H_ERR              CLEAR THE FLAG
            BRA   ML_4                  SEND THE GRIPPER HOME

ML_6     BRSET PBDR,CASS_PR,ML_3        CASSETTE IN BUCKY, CONTINUETO LOOP

BRSET PADR,GRIP_HM,ML_5     GRIPPER IS HOME CONTINUE
            LDAA  #0FFH
            STAA  GR_H_ERR              SET THE GPRIPPER HOME ERROR FLAG
            BRA   ML_3                  CONTINUE TO LOOP
```

```
ML_5    BRSET PCDR,GRIP_SW,ML_3        CHECK GRIPPER SWITCH IF OPEN LOOP AGAIN

JSR ACL                         START ACL OPERATION

ML_3    BRCLR PCDR,EJECT_SW,ML_4        BRANCH IF EJECT SWITCH CLOSED

BRSET PORTE,REEJ,MAIN           REMOTE EJECT NOT ACTIVE,BRANCH TO MAIN LOOP

ML_4    JSR EJECT                       EJECT CASSETTE

BRA MAIN                        BRANCH ALWAYS

; THE ACL PROGRAM LOOP STARTS HERE !

ACL     BRSET   PCDR,CHAN_HOM,IN_4      CHANNELS ARE HOME CONTINUE

IN_2    JSR     EJECT                   MOVE TO HOME POSITION

RTS                             START OVER

IN_4    BSET    PADR,BU_ACL_S           TURN ON BUCKY/ACL RELAY FOR ACL OPERATION

BRCLR   PORTE,CHAN_SET,IN_6     CHANNELS ARE SET BRANCH TO IN_6

JSR     STD_STS                 GO TO STANDARD MOTOR SET UP ROUTINE

JSR     M_FWD                   TURN ON CHANNEL MOTOR FORWARD

LDX     #10000                  LOAD X REGISTER WITH MAX RUN TIME
IN_5    JSR     F_TO_V                  READ SPEED FEEDBACK VALUE
        DEX                             DECREMENT X,1 LOOP EQUAL TO APPROX 200uSSEC
        BEQ     IN_6                    TIME HAS NOT EXPIRED,LOOP AGAIN

IN_30   BRSET   PORTE,IN_BL_S,IN_6      CASSETTE REMOVED STOP CHANNELS

BRSET   PORTE,CHAN_SET,IN_5     CHANNEL SET SWITCH STILL OPEN LOOP TO IN_3

IN_6    JSR     MOT_FSTOP               TURN OFF CHANNEL MOTOR,CHANNELS SET

LDAA    ENCD_CT                 LOAD A WITH ENCODER COUNT VALUE
        LDAB    PACNT                   LOAD B WITH PULSE COUNTER VALUE
***     SUBD    #62                     SUBTRACT 24 FROM TOTAL TO OFFSET SET SWITCH AND
                                        ****38 FOR ADDITIONAL TRAVEL(18.375)
        BGT     IN_6A                   IF GREATER THAN 0,BRANCH
        CLRA                            CLEAR CHANNEL COUNT
        CLRB                            CLEAR CHANNEL COUNT

IN_6A   STD     CHAN_CT                 STORE VALUE IN CHANNEL COUNT MEMORY

LDAA    #35                     LOAD SLOW SPEED VALUE

JSR     STD_STS                 GO TO STANDARD MOTOR SET UP ROUTINE

JSR     M_REV                   TURN ON THE MOTOR BACKWARDS

LDAA    #4                      NUMBER OF PULSES TO BACK OFF
        NEGA                            TWOS COMP
        STAA    PACNT                   STORE RESULT PULSE COUNTER

JSR     M_REV                   TURN ON CHANNEL MOTOR FORWARD
        LDX     #5000                   LOAD MAX RUN TIME IN X,1 SEC
IN_12   JSR     F_TO_V                  READ FEEDBACK VALUE
        DEX                             DECREMENT X,1 LOOP EQUAL TO APPROX 200uSSEC
```

|        |       |                    |                                                      |
|--------|-------|--------------------|------------------------------------------------------|
|        | BNE   | IN_40              | TIME HAS EXPIRED, STOP CHANNEL MOTOR                |
|        | LDAA  | #90                |                                                      |
|        | STAA  | SPEED_M            | LOAD, THIS VALUE TO PROVIDE BRAKE (BACK OFF)        |
|        | BRA   | IN_8               | TURN OFF MOTOR WITH BRAKE                            |
| IN_40  | LDAA  | GRIP_CT            | READ OVERFLOW VALUE                                  |
|        | BPL   | IN_12              | IF POSITIVE LOOP AGAIN                               |
| IN_8   | JSR   | MOT_RSTOP          | TURN OFF MOTOR WITH A BRAKE                          |

****AT THIS POINT, THE CASSETTE IS CENTERED AND SIZED IN THE OPENING OF THE ACL

|        |       |                      |                                                      |
|--------|-------|----------------------|------------------------------------------------------|
| IN_7   | BRSET | PORTE,IN_BL_S,IN_2   | BRANCH IF CASSETTE HAS BEEN REMOVED                 |
|        | JSR   | KICK                 | RESET THE WATCHDOG TIMER                             |
|        | BRSET | PCDR,GRIP_SW,IN_7    | GRIPPER SWITCH STILL OPEN, BRANCH TO LOOP           |
|        | BRSET | PORTE,CHAN_SET,IN_7  | CHANNEL SET SWITCH STILL OPEN LOOP.TO IN_3          |
|        | BSET  | PBDR,GR_CH_S         | TURN ON RELAY FOR GRIPPER OPERATION                  |
|        | LDAA  | #50                  | GO SLOW SPEED                                        |
|        | JSR   | STD_STS              | GO TO STANDARD MOTOR SET UP ROUTINE                  |
|        | LDAA  | #114                 | VALUE TO MOVE GRIPPER OUT .375(114 PULSES)          |
|        | NEGA  |                      | TWOS COMP TO OVERFLOW                                |
|        | STAA  | PACNT                | NUMBER OF PULSES TO BE COUNTED                       |
|        | JSR   | M_REV                | TURN ON THE MOTOR BACKWARDS                          |
|        | LDX   | #10000               | LOAD X WITH MAX RUN TIME 2 SEC                       |
| IN_9   | JSR   | F_TO_V               | READ SPEED FEEDBACK VALUE                            |
|        | DEX   |                      | DECREMENT X,1 LOOP EQUAL TO APPROX 200uSSEC         |
|        | BEQ   | IN_13C               | TIME HAS EXPIRED,GO TO ERROR ROUTINE                |
|        | LDAA  | GRIP_CT              | WHAT IS THE GRIP COUNT NOW                           |
|        | BPL   | IN_9                 | IF COUNT NOT ZERO LOOP AGAIN                         |
| IN_11A | JSR   | MOT_RSTOP            | TURN OFF GRIPPER MOTOR                               |
|        | JSR   | STD_ST               | GO TO STANDARD MOTOR SET UP ROUTINE                  |
|        | JSR   | M_FWD                | TURN ON GRIPPER MOTOR                                |
|        | LDX   | #40000               | LOAD X WITH MAX RUN TIME 6 SEC(60000)               |
| IN_13  | JSR   | F_TO_V               | READ SPEED FEEDBACK VALUE                            |
|        | DEX   |                      | DECREMENT X,1 LOOP EQUAL TO APPROX 200uSSEC         |
|        | BNE   | IN_13B               | TIME NOT HAS EXPIRED, CONTINUE                       |
| IN_13C | JSR   | MOT_FSTOP            | TURN OFF MOTOR                                       |
|        | JSR   | SL_TO_HM             | GO SLOW TO HOME                                      |
|        | CLR   | FULL_CT              | CLEAR TOTAL COUNT FOR COMPLETE 12 INCH TRAVEL       |
|        | CLR   | FULL_CT+1            |                                                      |
|        | BSET  | PBDR,GR_CH_S         | TURN ON RELAY FOR GRIPPER OPERATION                  |
|        | JSR   | SM_SZ                | MOVE THE GRIPPER PAST THE RELEASE POINT AND BAC    |
|        | BRA   | IN_OUT               | LEAVE ROUTINE                                        |
| IN_13B | LDAA  | ENCD_CT              | CHECK THE ENCODER COUNT                              |
|        | LDAB  | PACNT                |                                                      |
|        | CMPD  | #4575                | CHECK FOR THE MAX SIZE                               |
|        | BHI   | IN_13A               | BRANCH IF MAX LIMIT HIT (17 INCH FILM)              |
|        | BRCLR | PORTE,IN_BL_S,IN_13  | INPUT SENSOR BLOCKED,BRANCH TO IN_13                |

```
IN_13A    JSR     SIZE            GO FIND SIZE

IN_15     JSR     F_TO_V          READ SPEED FEEDBACK VALUE
          DEX                     DECREMENT X,1 LOOP EQUAL TO APPROX 200uSSEC
          BNE     IN_16           TIME HAS NOT EXPIRED,CONTINUE

BRA     IN_13C          TURN OFF MOTOR, TIME HAS EXPIRED

IN_16     LDAA    GRIP_CT         LOAD THE GRIPPER ENCODER COUNT
          BPL     IN_15           BRANCH IF COUNT NOT ZERO,CASSETTE NOT CENTERED

JSR     MOT_FSTOP       TURN OFF GRIPPER MOTOR

JSR     SID_SZ          GO FIND CASSETTE SIZE AND SEND DATA

LDD     TEMP_CT         LOAD CASSETTE TO SENSOR COUNT
          CMPD    #2200           COMPARE COUNT TO GRIPPER RELEASE POINT
          BHI     IN_17           IF VALUE IS HIGHER BRANCH

JSR     SM_SZ           MOVE CASSETTE PAST THE RELEASE POINT

IN_17     BSET    PBDR,CASS_PR    TURN ON CASSETTE PRESENT RELAY AND LIGHT
          BSET    PBDR,EX_CNT     TURN ON THE DATA LINE FOR EXTERNAL EVENT COUNTE
          JSR     DEL_R           DELAY
          BCLR    PBDR,EX_CNT     TURN ON THE DATA LINE FOR EXTERNAL EVENT COUNTE

IN_OUT    JSR     DIS_INT         TURN OFF RELAYS
          RTS                     GO BACK TO MAIN LOOP

; THIS ROUTINE PULLS SMALL CASSETTES IN PAST THE GRIP RELEASE THEN TAKES THE
; BACK TO CENTER
SM_SZ     LDAA    #2
          STAA    D_FLAG          LOAD THE DIRECTION REGISTER WITH 2
SM_A      LDAA    #50             DESIRED RUNNING SPEED (SLOW)

JSR     STD_STS         GO TO STANDARD MOTOR SET UP ROUTINE
          LDD     #3660           LOAD GRIPPER RELEASE POINT (12 INCHES FROM HOME
          SUBD    FULL_CT         SUBTRACT THE TO TOTAL COUNT
          STAA    GRIP_CT         NUMBER OF OVERFLOWS TO OCCUR
          NEGB                    TWOS COMP
          STAB    PACNT           STORE VALUE IN PULSE ACCUMULATOR

DEC     D_FLAG          SUBTRACT 1 FROM THE DIRECTION REGISTER
          BEQ     SM_B            IF EQUAL TO ZERO GO REVERSE

JSR     M_FWD           TURN ON GRIPPER MOTOR FORWARD

LDX     #20000          LOAD X WITH MAX RUN TIME OF 1 SEC EACH DIR
SM_7      JSR     F_TO_V          READ SPEED FEEDBACK VALUE

DEX                     DECREMENT X,1 LOOP EQUAL TO APPROX 200uSSEC
          BEQ     SM_6            TIME HAS EXPIRED,GO TO NEXT OPERATION

LDAA    GRIP_CT         WHAT IS THE COUNT NOW
          BPL     SM_7            IF PLUS LOOP AGAIN

SM_6      JSR     MOT_FSTOP       TURN OFF MOTOR
          BRA     SM_A            GO BACK TO START AND RUN MOTOR REVERSE

SM_B      JSR     M_REV           TURN ON MOTOR REVERSE DIRECTION

LDX     #20000          LOAD X WITH MAX RUN TIME OF 1 SEC EACH DIR
SM_7A     JSR     F_TO_V          READ SPEED FEEDBACK VALUE
          DEX                     DECREMENT X,1 LOOP EQUAL TO APPROX 200uSSEC
          BEQ     SM_5            TIME HAS EXPIRED,GO TO NEXT OPERATION
          BRSET   PADR,GRIP_HM,SM_5  IF GRIPPER HOME APPLY BRAKE
```

```
                LDAA    GRIP_CT             WHAT IS THE COUNT NOW
                BPL     SM_7A               IF PLUS LOOP AGAIN

SM_5            JSR     MOT_RSTOP           TURN OFF MOTOR

RTS                         RETURN

; TURN OFF INTERRUPTS AND MOTORS

DIS_INT         BCLR    PADR,BU_ACL_S       TURN OFF RELAY FOR BUCKY OPERATION
                BCLR    PBDR,GR_CH_S        TURN OFF GRIPPER/CHANNEL MOTOR SELECT RELAY
                JSR     DEL_R               DELAY FOR RELAY TO SWITCH

RTS

; THIS ROUTINE DETERMINES WHAT SIZE CASSETTE ENTERED THE BUCKY
; AND ENTERS THE COUNT FOR CENTER POSITION

SIZE            LDAA    ENCD_CT             GET THE ENCODER COUNT OVERFLOW VALUE
                LDAB    PACNT               GET VALUE IN PULSE ACCUMULATOR
                ADDD    #55                 ADD 55 PULSES FOR FOR CENTER OFFSET
                STD     TEMP_CT             SAVE COUNT IN TEMP MEMORY

LDD     #4636               LOAD THE MAX SIZE
                SUBD    TEMP_CT             SUBTRACT THE ACTUAL CASSETTE SIZE
                BPL     SZ_1                IF THE RESULT IS POSITIVE BRANCH
                CLRA
                LDAB    #02                 LOAD 2 COUNTS FOR THE COUNT IN

SZ_1            LSRD                        DIVIDE THE REMAINDER BY TWO
                STD     COUNT_I             STORE RESULT IN COUNT IN MEMORY LOCATION
                NEGB                        TWOS COMP FOR PULSE ACCUMULATOR
                STAB    PACNT               PLACE LOWER BYTE IN PULSE ACC COUNTER
                STAA    GRIP_CT             SAVE UPPER BYTE IN GRIP COUNT

RTS

THIS ROUTINE EJECTS CASSETTE

EJECT           CLR     GRIP_SZ             CLEAR GRIPPER SIZE MEMORY
                CLR     CHAN_SZ             CLEAR CHANNEL SIZE MEMORY
                CLRA                        CLEAR ACC. TO CLEAR CHANNEL SIZE
                JSR     SENDD               TURN OFF SIZE SENSING RELAYS

BCLR    PBDR,CASS_PR        TURN OFF CASSETTE PRESENT RELAY

JSR KICK                    RESET THE WATCHDOG TIMER

BRCLR   PCDR,EJECT_SW,EJECT EJECT COMMAND BRANCH TO EJECT(WAIT TILL SWITCH

BSET    PADR,BU_ACL_S       TURN ON RELAY FOR ACL OPERATION

BRSET   PADR,GRIP_HM,EJ_2   BRANCH IF GRIPPER HOME

EJ_4            JSR MOVE_GM_H               MOVE GRIPPER HOME ROUTINE
                BRSET   PADR,GRIP_HM,EJ_2   BRANCH IF GRIPPER HOME
                BRA     EJ_3                LEAVE ROUTINE AND WAIT FOR EJECT

EJ_2            JSR KICK                    RESET THE WATCHDOG TIMER

BRCLR   PORTE,IN_BL_S,EJ_2  IF INPUT SENSOR IS BLOCKED BRANCH TO EJ_2
                BRSET   PCDR,CHAN_HOM,EJ_3  IF CHANNELS HOME BRANCH TO EJ_3

JSR MOVE_CM_H               MOVE CHANNELS HOME,ENTRY AREA CLEAR
```

```
EJ_3        JSR DIS_INT                     TURN OFF RELAYS
            RTS                             RETURN

; RUN GRIPPER MOTOR HOME ROUTINE

MOVE_GM_H   BSET       PBDR,GR_CH_S         TURN ON RELAY TO SELECT GRIPPER MOTOR

LDD        FULL_CT              THIS IS THE TOTAL COUNT TO HOME
            BNE        GM_31                IF NUMBER NOT EQUAL TO ZERO,CASSETTE SIZE KNOWN

LDD        #4436
            STD        SL_CT                ASSUME LARGEST CASSETTE
            INC        M_ERRR               SET THE MEMORY ERROR FLAG
            LDAA       #50                  SLOW SPEED VALUE
            JSR        STD_STS              GET THE STANDARD START PERAMETERS
            BRA        GM_32                BRANCH TO GO SLOW TO SENSOR

GM_31       SUBD       #200H                SUBTRACT 200HEX FROM FULL COUNT
            STD        SL_CT                STORE IN SLOW COUNT MEMORY

JSR        STD_ST               GO TO STANDARD MOTOR SET UP ROUTINE

GM_32       JSR        M_REV                TURN ON GRIPPER MOTOR REVERSE DIR

LDX        #15000               LOAD MAX RUN TIME
GM_1        JSR        RUN                  ADJUST SPEED VALUE AND GET NEW COUNT
            DEX                             DECREMENT X,1 LOOP EQUAL TO APPROX 200uSSEC
            BEQ        GM_35                TIME HAS EXPIRED,LEAVE ROUTINE

BRCLR      PORTE,IN_BL_S,GM_12  IF ENTRY AREA BLOCKED,FIND STOP COUNT

CPD        SL_CT                COMPARE ACTUAL VALUE TO SLOW COUNT

BHI        GM_1A                VALUE IS LOWER,GO SLOW

BRCLR      PADR,GRIP_HM,GM_1    IF GRIPPER NOT HOME LOOP AGAIN

GM_35       JMP        GM_HD                GRIPPER IS HOME,APPLY BRAKE

GM_1A       BRA        SL_TO_HM             GO SLOW

GM_12       LDAB       PACNT                GET THE PULSE ACCUMULATOR COUNT
            LDAA       ENCD_CT              LOAD THE ENCODE COUNT
            STD        TSEN_CT              STORE VALUE AT TO SENSOR COUNT
            ADDD       #800H                ADD 800HEX TO THE ABSOLUTE COUNT
            STD        STOP_CT              THIS COUNT WILL STOP THE CASSETTE AT 8IN

LDD        FULL_CT              GET THE TOTAL COUNT VALUE
            SUBD       TSEN_CT              SUBTRACT TO SENSOR COUNT
            CPD        #800H                COMPARE COUNT HOME TO STOP COUNT VALUE

BLO        N_STOP1              IF LOWER BRANCH TO NO STOP 1

GM_34       LDX        #20000               LOAD MAX RUN TIME
GM_2        JSR        RUN                  READ NEW SPEED VALUE AND GET NEW COUNT
            DEX                             DECREMENT X,1 LOOP EQUAL TO APPROX 200uSSEC
            BEQ        GM_35                TIME HAS EXPIRED,LEAVE ROUTINE

BRSET      PADR,GRIP_HM,GM_HD   GRIPPER IS HOME,APPLY HARD BRAKE

CPD        STOP_CT              COMPARE NEW COUNT WITH STOP_CT

BLO        GM_2                 IF VALUE IS LOWER LOOP AGAIN

JSR        MOT_RSTOP            TURN OFF GPIPPER MOTOR
```

```
GM_3        BRSET    PADR,GRIP_HM,GM_OUT  GRIPPER IS HOME, LEAVE ROUTINE

JSR      KICK                 RESET THE WATCHDOG TIMER

BRCLR    PORTE,IN_BL_S,GM_3   ENTRY AREA STILL BLOCKED,LOOP AGAIN

LDAA     M_ERRR               LOAD THE ERROR FLAG
            BNE      SL_TO_HM             ERROR FLAG IS SET GO SLOW

LDAA     ENCD_CT              GET NEW ENCODER COUNT
            LDAB     PACNT                GET PULSE COUNT
            STD      STOP_V               STORE RESULT IN STOP VALUE MEMORY
            LDD      FULL_CT              LOAD TOTAL COUNT
            SUBD     STOP_V               SUBTRACT ACTUAL STOP VALUE
            CPD      #200H                COMPARE WITH 200 COUNT
            BLO      SL_TO_HM             BRANCH IF SLOW NEEDED

JSR      STD_ST               GO TO STANDARD MOTOR SET UP ROUTINE
            LDD      STOP_V
            STAA     ENCD_CT              REPLACE DATA LOST IN THE STD_ST ROUTINE
            STAB     PACNT                REPLACE DATA LOST IN THE STD_ST ROUTINE

JSR      M_REV                TURN GRIPPER MOTOR ON REVERSE

N_STOP1     LDX      #20000               LOAD 4 SEC MAX RUN TIME IN X
GM_5        JSR      RUN                  READ SPEED FEEDBACK VALUE AND GET NEW COUNT
            DEX                           DECREMENT X,1 LOOP EQUAL TO APPROX 200uSSEC
            BEQ      GM_HD                TIME HAS EXPIRED,LEAVE ROUTINE

BRSET    PADR,GRIP_HM,GM_HD   IF GRIPPER HOME APPLY BRAKE

CPD      SL_CT                COMPARE ACTUAL COUNT TO SLOW COUNT VALUE

BLO      GM_5                 LOOP AGAIN

SL_TO_HM    LDAA     #50                  SLOW SPEED VALUE
            STAA     SPEED                SLOW SPEED UNTIL HOME

JSR      M_REV                TURN GRIPPER MOTOR ON REVERSE

LDX      #20000               LOAD 4 SEC MAX RUN TIME IN X
GM_6        JSR      F_TO_V               READ NEW SPEED VALUE
            DEX                           DECREMENT X,1 LOOP EQUAL TO APPROX 200uSSEC
            BEQ      GM_HD                TIME HAS EXPIRED,LEAVE ROUTINE

BRCLR    PADR,GRIP_HM,GM_6    GRIPPER NOT HOME LOOP AGAIN

GM_HD       JSR      MOT_RSTOP            TURN OFF GRIPPER MOTOR AND APPLY BRAKE

GM_OUT      BCLR     PBDR,GR_CH_S         TURN OFF GRIPPER MOTOR SELECT RELAY
            CLR      M_ERRR               CLEAR POWER ERROR FLAG
            CLR      FULL_CT
            CLR      FULL_CT+1
            RTS
**** THIS ROUTINE RUNS THE GRIPPER MOTOR OUTWARD AND GETS THE NEW COUNT

RUN         JSR      F_TO_V
            LDAA     ENCD_CT              LOAD ENCODER COUNT
            LDAB     PACNT                LOAD THE NEW PULSE COUNT
            RTS
; RUN CHANNEL MOTOR HOME ROUTINE

MOVE_CM_H   CLR      AD_RES               CLEAR A TO D RESULT REGISTER
            CLR      AD_RES+1             CLEAR A TO D RESULT REGISTER
```

```
CH_2A     LDAA      #8                      LOAD THE NUMBER OF COUNTS TO BE AVERGED
          STAA      AD_CT

JSR       STD_ST                  GO TO STANDARD MOTOR SET UP ROUTINE
          LDX       #1200                   LOAD NUMBER OF CYCLES TO GET UP TO SPEED

JSR       M_REV                   TURN ON CHANNEL MOTOR REVERSE DIR
CH_3      JSR       F_TO_V
          BRSET     PCDR,CHAN_HOM,CH_1      IF CHANNELS HOME BRANCH TO CH_1
          DEX                               DECREMENT X VALUE LOOPS TO GET UP TO SPEED
          BNE       CH_3                    IF THE NUMBER OF CYCLES NOT ZERO BRANCH

LDX       #10000                  LOAD X WITH MAX RUN TIME 2 SEC
CH_4      JSR       F_TO_V                  READ FEEDBACK VALUE
          DEX                               DECREMENT X,1 LOOP EQUAL TO APPROX 200uSSEC
          BEQ       CH_1                    TIME HAS EXPIRED,STOP CHANNEL MOTOR

BRSET     PCDR,CHAN_HOM,CH_1      IF CHANNELS HOME BRANCH TO CH_1

CLRA                              CLEAR ACCUMULATOR A (MSB)
          LDAB      SPEED_M                 GET VALUE OF SPEED
          ADDD      AD_RES                  ADD VALUE TO A TO D RESULT REGISTER
          STD       AD_RES                  STORE RESULT IN A TO D RESULT REGISTER
          DEC       AD_CT                   DECREMENT THE LOOP COUNT
          BNE       CH_4                    IF COUNT HAS NOT REACHED ZERO LOOP AGAIN

LDAA      #7                      LOAD THE NUMBER OF SAMPLES TO BE AVERAGED
          STAA      AD_CT

LDD       AD_RES
          LSRD                              DIVIDE THE RESULT BY 2
          LSRD                              DIVIDE THE RESULT BY 2
          LSRD                              DIVIDE THE RESULT BY 2
          STD       AD_RES

CPD       #67                     IS SPEED IS LESS THAN 67
          BHI       CH_4                    LOOP AGAIN

CH_BO     JSR       MOT_RSTOP               TURN OFF CHANNEL MOTOR(WITH BRAKE)

JSR       STD_ST                  GET STARDARD MOTOR SETUP

LDAA      #50                     NUMBER OF PULSES TO BACK OFF
          NEGA                              TWOS COMP
          STAA      PACNT                   STORE RESULT PULSE COUNTER

JSR       M_FWD                   TURN ON CHANNEL MOTOR FORWARD
          LDX       #5000                   LOAD MAX RUN TIME IN X,1 SEC
CH_10     JSR       F_TO_V                  READ FEEDBACK VALUE
          DEX                               DECREMENT X,1 LOOP EQUAL TO APPROX 200uSSEC
          BEQ       CH_1                    TIME HAS EXPIRED,STOP CHANNEL MOTOR

LDAA      GRIP_CT                 READ OVERFLOW VALUE
          BPL       CH_10                   IF POSITIVE LOOP AGAIN

CH_1      JSR       MOT_RSTOP               TURN OFF CHANNEL MOTOR

RTS

;THIS ROUTINE IS THE STANDARD MOTOR SETUP TO START MOTORS AND TURN ON PULSE COUNTER

STD_ST    LDAA      #90
STD_STS   STAA      SPEED                   SET INITIAL SPEED
          JSR       DEL_R                   DELAY TO ALLOW RELAYS TO SWITCH
          LDAA      #40H
          STAA      PACTL                   TURN ON PULSE ACCUMULATOR
          CLR       PACNT                   CLEAR THE PULSE COUNTER
```

```
              CLR    GRIP_CT              CLEAR THE GRIP COUNT MEMORY
              CLR    ENCD_CT              CLEAR THE ENCODER COUNT MEMORY
              LDD    #60                  INITIAL VALUE FOR ONTIME

STD    ONTIME               SET INITIAL VALUE OF ONTIME

RTS                         RETURN

;    BRAKE MOTOR FOR SHORT TIME

MOT_RSTOP     JSR    P_OFF                TURN OFF MOTOR
              LDD    #60
              STD    ONTIME               SET INITIAL DUTY CYCLE

JSR    M_FWD                TURN ON MOTOR FORWARD
              BRA    MOT_1

MOT_FSTOP     JSR    P_OFF                TURN OFF MOTOR
              LDD    #60
              STD    ONTIME               SET INITIAL DUTY CYCLE

JSR    M_REV                TURN ON THE MOTOR REV
MOT_1         CLR    PACTL                TURN OFF PULSE ACCUMULATOR

LDAB   SPEED_M              GET LAST SPEED READING
              CLRA                        CLEAR UPPER BYTE
              XGDY                        MOVE SPEED VALUE TO Y REGISTER

JSR    DELAY                DELAY DEPENDING ON LAST SPEED READING

JSR    P_OFF                TURN OFF MOTOR

RTS                         RETURN

; THE F TO V ROUTINE WILL READ THE FEEDBACK VOLTAGE AND UPDATE THE
; PWM OUTPUT ACCORDINGLY

F_TO_V        LDAA   #10H                 SELECT CHANNELS 1 - 4
              STAA   ADCTL                STORE VALUE IN A/D CONTROL REGISTER
AD_LOP        LDAA   ADCTL                WHAT IS THE STATUS OF A/D
              BPL    AD_LOP               LOOP UNTIL A/D COMPLETE
              CLR    PULSE                KEEP THIS REG. CLEAR TO INHIBIT AUTO INCREASE
              LDD    #80                  MAX. VALUE FOR ONTIME
              STD    BUC_FRE              SET REGISTER AT MAX. LIMIT

LDAA   ADR1                 WHAT IS THE CURRENT SPEED
              STAA   SPEED_M              SAVE THIS VALUE IN SPEED MEMORY
              CMPA   SPEED                COMPARE DESIRED SPEED TO ACTUAL SPEED
              BLO    FAST                 MOTOR IS RUNNING TOO SLOW BRANCH TO FAST

LDD    ONTIME               WHAT IS THE CURRENT VALUE OF ON TIME
              ADDD   #3                   ADD THREE TO ON TIME
              BRA    A_EXIT               GO WITH NEW VALUE

FAST          LDD    ONTIME               WHAT IS THE CURRENT ONTIME VALUE
              SUBD   #3                   SUBTRACT 3 FROM ON TIME

A_EXIT        STD    ONTIME               STORE NEW VALUE OF ON TIME

JSR    ON_CHK               CHECK LIMITS OF ONTIME
A_EX2         RTS                         LEAVE A/D ROUTINE

;THIS ROUTINE IS THE STANDARD RELAY DELAY USED ANY TIME MOTOR RELAYS ARE SWITCHED

DEL_R         LDY    #400                 80 MSEC DELAY VALUE
```

; DELAY ROUTINE -- SET "Y" WITH VALUE FOR DELAY    DELAY = (Y) * (200 uSEC)

```
DELAY     STY  DEL_T
DELAY_1   LDY  DEL_T                  GET DELAY TIME VALUE
          BNE  DELAY_1                IF NOT EQUAL TO ZERO LOOP AGAIN

RTS
```

; THIS IS THE PULSE ACCUMULATOR OVERFLOW ROUTINE

```
ENCODE    INC  ENCD_CT                INCREMENT ENCODER COUNT LOCATION
          DEC  GRIP_CT                DECREMENT GPIPPER ENCODER COUNT
          LDAA #$20
          STAA TFLG2                  SET OVERFLOW FLAG

RTI                         RETURN FROM INTERUPT
```

; THE BUCKY PROGRAM LOOP STARTS HERE !

```
BUCKY     BCLR PADR,BU_ACL_S          TURN OFF BUCKY/ACL RELAY FOR BUCKY OPERATION

JSR  HOME                   SEND BUKCY TO HOME POSITION

JSR  REE_DIP                READ DIP SWITCH FOR SET-UP OPERATION

JSR  BUC_SET                SET REGISTERS ACCORDING TO DIP SWITCH SETTINGS

BRCLR PORTE,INSW,BCKY       BRANCH IF START SWITCH OPEN

BSR  BUC_GO                 EXECUTE BUCKY SUBROUTINE

BCKY      RTS
```

; THE BUC_GO IS THE MAIN LOOP THAT WILL KEEP BUCKY RUNNING

```
BUC_GO    CLR  GFPOS                  RESET POSITION TO ZERO
          LDD  #48                    MAX. SPEED VALUE
          STD  ONTIME                 SET DUTY CYCLE REG.
          JSR  M_FWD                  MOVE IN FORWARD DIRECTION

DEC  AUTO                   UPDATE AUTO STOP REGISTER

POS_LOP   LDAA EMN                    GET ERROR NUMBER REGISTER CONTENTS
          BEQ  NO_ER                  BRANCH IF NO ERRORS HAVE OCCURRED

JSR  ERROR                  JUMP TO ERROR HANDLING ROUTINE

BRA  H_DONE                 BRANCH ALWAYS

NO_ER     LDAA GFPOS                  GET CURRENT POSITION
          CMPA STROKE                 NUMBER OF PULSES TO TRAVEL

BHS  EXTEND                 BRANCH WHEN POSITION REACHED

CMPA #4                     MINIMUM MOVEMENT REQUIRED BEFORE TURNING ON REL
          BLS  POS_LOP                BRANCH UNTIL MIN. REACHED

CMPA #30                    MINIMUM MOVEMENT REQUIRED BEFORE GOING HOME
          BLO  CON_T                  BRANCH IF LESS THAN 15 ENCODER COUNTS

BRCLR PORTE,INSW,SAF_1      BRANCH IF START SWITCH OPEN*

CON_T     TST  MIN_SPD                SEE IF SPEED FLAG SET
          BEQ  POS_LOP                BRANCH UNTIL SPEED REACHED
```

```
            BSET PBDR,RAY              TURN ON EXPOSURE RELAY

LDAA AUTO                  GET AUTO FLAG REG.
            BNE POS_LOP                BRANCH IF NOT TO AUTO STOP

SAF_1       JSR HOME                   SEND TO HOME POSITION*

JSR SW_CHK                 WAIT UNTIL START SWITCH OPENS*

BRCLR PCDR,TIM_EJ,H_END    BRANCH IF NOT TO AUTOMATICALLY EJECT*

JSR EJECT                  EJECT CASSETTE*

BRA H_END

EXTEND      LDD #48                    MAX. SPEED VALUE
            STD ONTIME                 SET DUTY CYCLE REG.

JSR M_REV                  MOVE IN REVERSE DIRECTION

LDY #RUN_CON               SET Y TO RUN_CON ADDRESS
            BSET 00H,Y,OUT             SET EXTENDED FLAG

CLR GFPOS                  RESET POSITION TO ZERO

H_LOP       LDAA EMN                   GET ERROR NUMBER REGISTER CONTENTS
            BEQ NO_STOP                BRANCH IF NO ERRORS HAVE OCCURRED

JSR ERROR                  JUMP TO ERROR HANDLING ROUTINE

BRA H_DONE                 BRANCH ALWAYS

H_END       JSR QDT                    OUTPUT QDT DATA

H_DONE      RTS                        EXIT BUCKY PROGRAM

NO_STOP     BRSET PADR,HOMSW,H_LOP     BRANCH UNTIL HOME

JMP BUC_GO                 BRANCH ALWAYS

; THE SET_UP ROUTINE WILL READ THE DIP SWITCH AND STORE THE 8-BIT
; VALUE IN THE SWITCH REGISTER

REE_DIP     BSET PBDR,DSW_SEL          SELECT DIP SWITCH POSITIONS 1-4

LDAA PCDR                  GET DIP SWITCH DATA
            LSRA
            LSRA
            LSRA
            LSRA                       MOVE BIT 4-7 INTO BITS 0-3

BCLR PBDR,DSW_SEL          SELECT DIP SWITCH POSITIONS 5-8

LDAB PCDR                  GET DIP SWITCH DATA
            ANDB #0F0H                 SET BITS 0-3 TO ZERO
            ABA                        ADD ACCUMLATORS

STAA SWITCH                SAVE DIP SWITCH VALUE
            RTS
```

; THE BUC_SET ROUTINE WILL INTERPRET THE SWITCH REGISTER AND SET
; CONTROL REGISTERS THAT ARE USED BY THE BUCKY

```
BUC_SET  CLR MIN_SPD             CLEAR MINIMUM SPEED CONTROL FLAG REG.
         CLR EMN                 RESET ERROR MESSAGE NUMBER REGISTER
         CLR FIR_STR             RESET FIRST STROKE TIME COUNTER
         CLR FIR_STR+1
         CLR RUN_CON             RESET RUN CONTROL FLAGS

LDAA #S_VALUE           GET STALL VALUE
         STAA STALL              SET STALL REGISTER VALUE

LDAA #A_STOP            GET AUTO STOP VALUE
         STAA AUTO               SAVE VALUE IN REGISTER

LDAA #5                 NUMBER OF ERRORS ALLOWED BEFORE SHUT DOWN
         STAA ECNT               SET ERROR COUNTER

LDAA SWITCH             GET DIP VALUES
         COMA
         ANDA #0FH               REMOVE UPPER FOUR BITS
         LSLA                    MULTIPLY BY 2
         ADDA #2                 MAKE SURE MINIMUM IS-TWO PULSES
         STAA RAY_STR            SAVE START POSITION FOR X-RAY RELAY

LDAA SWITCH             GET DIP SWITCH INFORMATION
         ANDA #30H               REMOVE ALL BUT THE STROKE BITS
         LSRA
         LSRA                    MAKE SURE MAX. NUMBER IF 12
         ADDA #40                MINIMUM NUMBER OF PULSES PER STROKE
         STAA STROKE             SAVE NUMBER OF PULSES PER STROKE

LDAA SWITCH             GET DIP SWITCH DATA
         BMI SET_SUP             BRANCH IF SUPER SPEED SELECTED

JSR FRE_12K             SET FREQUENCY FOR 12KHz

LDD #FREQ1/2            SET FOR 50% SPEED
         STD ONTIME              SET ONTIME FOR 50% SPEED

LDAA #PAR_LO            GET DESIRED TIME BETWEEN FLAG PULSES

STAA DES_LO             SET DESIRED SPEED
         LDAA #PAR_HI            GET DESIRED TIME BETWEEN FLAG PULSES
         STAA DES_HI             SET DESIRED SPEED

BRA BUC_END             BRANCH ALWAYS

SET_SUP  JSR FRE_120             SET FREQUENCY FOR 120Hz

LDD #FREQ2/2            GET PERIOD COUNT
         STD ONTIME              SET ONTIME FOR 50% DUTY CYCLE

LDAA #SUPER_LO          GET DESIRED TIME BETWEEN FLAG PULSES
         STAA DES_LO             SET DESIRED SPEED
         LDAA #SUPER_HI          GET DESIRED TIME BETWEEN FLAG PULSES
         STAA DES_HI             SET DESIRED SPEED

BUC_END  RTS                     EXIT ROUTINE
```

; THE HOME ROUTINE WILL MOVE BUCKY TO HOME POSITION

```
HOME     BRCLR PADR,HOMSW,HL5    BRANCH IF HOME

JSR M_REV               TURN MOTOR ON FORWARD TO BEGIN BRAKE
```

```
              LDY #32
              JSR DELAY

JSR P_OFF                    TURN MOTOR OUTPUTS OFF

CLR PULSE                    RESET CURRENT TIMING COUNTER
       HL1    LDAA PULSE                   GET NEW COUNT
              CMPA #H_DEL                  NUMBER OF COUNTS TO WAIT BEFORE GOING HOME
              BLS HL1                      BRANCH UNTIL COUNT IS REACHED

JSR FRE_12K                  SET FREQUENCY FOR 12KHz

LDD #FREQ1/4                 SET FOR 50% SPEED
              STD ONTIME                   SET ONTIME FOR 50% SPEED

LDAA #PAR_LO                 GET DESIRED TIME BETWEEN FLAG PULSES
              STAA DES_LO                  SET DESIRED SPEED
              LDAA #PAR_HI                 GET DESIRED TIME BETWEEN FLAG PULSES
              STAA DES_HI                  SET DESIRED SPEED

JSR M_REV                    START MOVING TOWARDS HOME

LDY #10000                   VALUE * 200uS IS TIME TO GET HOME
              STY DEL_T                    SET VALUE IN MEMORY

HL2    BRCLR PADR,HOMSW,HL3         BRANCH IF HOME

JSR KICK                     KICK WATCHDOG

LDY DEL_T                    GET REMAINING TIME TO GO HOME
              BEQ HL4                      BRANCH IF TIMED OUT

BRSET PADR,HOMSW,HL2         BRANCH IF NOT HOME YET

LDY #RUN_CON                 SET Y TO ADDRESS OF RUN_CON
              BRSET 00H,Y,HOM_CON,HL6      BRANCH IF HOME HAS ALREADY BEEN REACHED ONCE

CLR GFPOS                    RESET POSITION COUNTER
              BSET 00H,Y,HOM_CON           SET SENSOR FLAG

HL6    LDAA GFPOS                   GET NEW POSITION
              CMPA #8                      PULSES PAST HOME SENSOR
              BHS HL3                      BRANCH IF POSITION IS REACHED

BRA HL2                      BRANCH ALWAYS

HL4    LDAA #'1'                    ERROR MESSAGE NUMBER
              STAA EMN                     SAVE ERROR MESSAGE NUMBER

JSR ERROR                    DISPLAY ERROR MESSAGE

BRA HL7                      BRANCH ALWAYS

HL3    JSR M_FWD                    TURN MOTOR ON FORWARD TO BEGIN BRAKE

LDY #63
              JSR DELAY

HL5    JSR P_OFF                    TURN MOTOR OUTPUTS OFF

BRSET PORTE,INSW,HL7         BRANCH IF START SWITCH CLOSED

BCLR PBDR,RAY                TURN OFF EXPOSURE RELAY
```

```
HL7     RTS                             EXIT HOME ROUTINE

; THE FRE_12K WILL SET OC1 INTERRUPTS FOR 12KHz

FRE_12K LDD #FREQ1                      VALUE FOR 12KHz
        STD PERIOD                      SET PERIOD FOR 12KHz
        SUBD #60                        LIMIT MAX. BUCKY ONTIME
        STD BUC_FRE                     SET BUCKY ONTIME LIMIT
        RTS

; THE FRE_120 WILL SET OC1 INTERRUPTS FOR 120 Hz

FRE_120 LDD #FREQ2                      VALUE FOR 120Hz
        STD PERIOD                      SET PERIOD FOR 120Hz
        STD BUC_FRE                     SET BUCKY ONTIME LIMIT
        RTS

; TURN MOTOR ON FORWARD

M_FWD   LDAA #FORD                      VALUE FOR FORWARD DIRECTION
        STAA TCTL1                      TURN MOTOR ON FORWARD
        RTS

; TURN MOTOR ON REVERSE

M_REV   LDAA #REVS                      VALUE FOR REVERSE DIRECTION
        STAA TCTL1                      TURN MOTOR ON REVERSE

RTS

; TURN MOTOR OUTPUTS OFF

P_OFF   LDAA #POFF                      VALUE TO TURNS OUTPTUS OFF
        STAA TCTL1                      TURN MOTOR OUTPUTS OFF
        RTS

; INPUT CAPTURE #3 INTERRUPT ROUTINE WILL DETERMINE THE SPEED AND THE
; CURRENT POSITION OF THE GRID FRAME

F_CODE  INC GFPOS                       UPDATE POSITION. (GFPOS/2=CURRENT POS.)

LDAA PULSE                      GET FLAG ENCODER TIME
        CLR PULSE

NO_SAV  BRCLR PADR,FLAG_IN,LOW  BRANCH IF CLEAR SPOT IN FLAG IS PRESENT

LDAB DES_HI                     GET DESIRED TIME BETWEEN FLAG PULSES HIGH
        CBA                             COMPARE ACCUMULATORS
        BHI TO_SLO                      BRANCH IF MOVING TO SLOW

LDAB #255
        STAB MIN_SPD                    SET MINIMUM SPEED FLAG
        BRA QUICK                       BRANCH IF MOVING TO FAST

LOW     LDAB DES_LO                     GET DESIRED TIME BETWEEN FLAG PULSES
        CBA                             COMPARE ACCUMULATORS
        BHI TO_SLO                      BRANCH IF MOVING TO SLOW

LDAB #255
        STAB MIN_SPD                    SET MINIMUM SPEED FLAG
        BRA QUICK                       BRANCH IF MOVING TO SLOW

TO_SLO  LDD ONTIME                      GET CURRENT PWM ONTIME
        SUBD #4                         INCREASE ACTUAL ONTIME

BRA B_END                       BRANCH ALWAYS
```

```
QUICK    LDD ONTIME              GET CURRENT ONTIME
         ADDD #2                 DECREASE ACTUAL ONTIME

B_END    JSR ON_CHK              CHECK LIMITS OF ONTIME

B_EXIT   LDAA #00000001B         RESET VALUE FOR INPUT #3 CAPTURE FLAG
         STAA TFLG1              RESET FLAG
         RTI

; SUBROUTINE TO CHECK FOR ONTIME LIMITS

ON_CHK   CPD BUC_FRE             CHECK FOR MAX. LIMIT
         BLO W_LOP               BRANCH IF LESS THAN MAX. LIMIT

LDD BUC_FRE             MAX. LIMIT VALUE
         BRA BONE                BRANCH ALWAYS

W_LOP    CPD #15                 CHECK FOR MINIMUM LIMIT
         BHI BONE                BRANCH IF HIGHER THAN LIMIT

LDD #16                 MINIMUM LIMIT VALUE

BONE     STD ONTIME              RESET ONTIME VALUE

JSR KICK                RESET THE WATCHDOG TIMER

RTS

; OUTPUT COMPARE TIMER #1 IS USED TO SET A BASE FREQUENCY

PWM_OSC  LDD ONTIME              GET PWM ONTIME
         ADDD PTDR               ADD CURRENT MAIN TIMER CONTENTS
         STD HTOC2               SET TIME FOR TIMER #2
         STD HTOC3               SET TIME FOR TIMER #3

LDD PERIOD              GET PERIOD FOR OPERATION FREQUENCY
         ADDD PTDR               MAIN TIMER REGISTERS
         STD HTOC1               SET OUPUT COMPARE TIMER #1
BYE      LDAA #10000000B         RESET VALUE INTERRUPT FLAG FOR TIMER #1
         STAA TFLG1              RESET FLAG

RTI                     RETURN FORM INTERRUPT

; THE PULSE TIMER INTERRUPT ROUTINE IS USED TO TIME THE FLAG ENCODER
; PULSES USING THE PULSE RAM LOCATION REGISTER. THIS INTERRUPT IS SET
; FOR 200 uS INTERRUPTS

FLAG_TI  LDY DEL_T               LOAD Y WITH DELAY TIME AMOUNT
         BLE FLG_1               BRANCH IF DEL_T IS <=0

DEY                     DECREMENT DELAY VALUE IN Y REGISTER
         STY DEL_T               STORE NEW VALUE OF DELAY TIME

FLG_1    BRSET PADR,BU_ACL_S,FLG_END

BRCLR PBDR,RAY,FLG_2    BRANCH IF XRAY RELAY IS OFF

LDY #RUN_CON            SET Y TO RUN_CON ADDRESS
         BRSET 00H,Y,OUT,FLG_2   BRANCH IF EXTEND FLAG HAS BEEN SET

LDX FIR_STR             GET CURRENT FIRST STROKE TIME
         INX                     ADD TO CURRENT TIME
         STX FIR_STR             SAVE NEW TIME
```

```
FLG_2    LDAA PULSE              GET FLAG ENCODER TIME
         ADDA #1                 INCREMENT TIME
         STAA PULSE              SAVE NEW VALUE
         CMPA #200               MAX. TIME ALLOWED
         BLO FLG_END             BRANCH IF MOVING FAST ENOUGH

DEC STALL               DECREMENT STALL VALUE
         BNE FLG_3               BRANCH IF STALL NOT ZERO

LDAA #'2'               MOTOR STALL ERROR NUMBER
         STAA EMN                SET ERROR NUMBER REGISTER

FLG_3    LDD ONTIME              GET CURRENT ONTIME
         CPD #15
         BLS FLG_END             BRANCH IF CANT BE MADE ANY FASTER

SUBD #3                 INCREASE SPEED
         STD ONTIME              SAVE NEW ONTIME

FLG_END  LDD #400                VALUE FOR 200uS
         ADDD PTDR               ADD CURRENT TIMER VALUE
         STD HTOC4               RESET COMPARE REGISTER 4

LDAA #00010000B         RESET VALUE FOR TIMER #4
         STAA TFLG1              RESET FLAG
NONE     RTI

; QDT OUTPUT ROUTINES

QDT      LDAB #21H               ASCII !
         JSR TRANS               SEND TO QDT TO DENOTE BUCKY DATA

LDD  FIR_STR            LOAD BUCKY SPEED DATA
         JSR CONSEND             CONVERT TO ASCII AND SEND FOUR CHARACTERS

LDAB #20H               ASCII SPACE
         JSR TRANS

LDAA  STROKE
         LDAB  RAY_STR
         JSR   CONSEND

RTS

; TRANSMIT DATA IN ACCUMULATOR B

TRANS    LDAA SCSR               SERIAL COMM. STATUS REGISTER
         BITA #0C0H              CHECK TRANSMIT REG. TO SEE IT READY
         BEQ TRANS               BRANCH UNTIL READY

STAB SCDR               SEND DATA TO TRANSMITTER
         RTS

; THE ERROR ROUTINE WILL SEND ERROR MESSAGE TO QDT AND RETURN TO MAIN LOOP

ERROR    JSR P_OFF               TURN BUCKY MOTOR OFF

LDAB #25H               ASCII %
         JSR TRANS               SEND TO QDT TO DENOTE BUCKY DATA

LDAB #'E'               CODE FOR ERROR OUTPUT
         JSR TRANS               TRANSMIT DATA
         LDAB EMN                GET ERROR NUMBER
         JSR TRANS               TRANSMIT ERROR NUMBER
```

```
            DEC   ECNT                UPDATE ERROR COUNTER
            BNE   ER1                 BRANCH IF NOT 0

ER2         JSR   SW_CHK              WAIT UNTIL START SWITCH OPENS

BCLR  PBDR,RAY            MAKE SURE X-RAY RELAY IS OFF

BRA   ER2                 BRANCH ALWAYS

ER1         JSR   SW_CHK              WAIT UNTIL START SWITCH OPENS

BCLR  PBDR,RAY            MAKE SURE X-RAY RELAY IS OFF

JSR   HOME                SEND THE GRID HOME

RTS
```

**** THIS ROUTINE TAKES THE 16 BIT DATA IN THE A AND B REGISTER AND PREPARES THE
**** DATA FOR CONVERTION

```
CONSEND     STAB  DATA_M              STORE B IN DATA MEMORY LOCATION
            JSR   ASCII               CONVERT TO ASCII AND SEND DATA
            LDAA  DATA_M              GET DATA STORED IN MEMORY
            JSR   ASCII               CONVERT TO ASCII AND SEND DATA

RTS                       RETURN TO PROGRAM
```

****THIS ROUTINE GETS DATA FROM THE CDATA MEMORY AND CONVERTS IT TO ASCII CODE
****AND SENDS TWO ASCII CHARACTERS TO THE DISPLAY VIA SCI PORT

```
ASCII       STAA  CDATA
            LDAB  CDATA               GET VALUE TO CONVERT
            ANDA  #0FH                REMOVE UPPPER NIBBLE
            CMPA  #0AH                SEE IF NUMERICAL OR ALPHA
            BLO   H_1                 IF LOWER THE VALUE IS NUMERICAL

ADDA  #37H                VALUE TO CHANGE ALPHA TO ASCII
            BRA   H_2

H_1         ADDA  #30H                VALUE TO TO CHANGE NUMERICAL TO ASCII
H_2         STAA  ADATA               STORE ASCII CHARACTER IN MEMORY
            LSRB                      SHIFT RIGHT 4 TIMES
            LSRB
            LSRB
            LSRB
            CMPB  #0AH                SEE IF NUMERICAL OR ALPHA
            BLO   H_3                 IF LOWER THE VALUE IS NUMERICAL

ADDB  #37H                VALUE TO CHANGE ALPHA TO ASCII
            BRA   H_4
H_3         ADDB  #30H                VALUE TO TO CHANGE NUMERICAL TO ASCII

H_4         JSR   TRANS               SEND DATA OUT SERIAL PORT

LDAB  ADATA               GET ASCII DATA
            JSR   TRANS               SEND DATA OUT SERIAL PORT

RTS
```

*** THIS ROUTINE WILL CHECK BUCKY START SWITCH AND WAIT UNTIL
* SWITCH OPENS BEFORE LEAVING *

```
SW_CHK  JSR  KICK.                          KICK WATCHDOG

BRSET PORTE,INSW,SW_CHK             BRANCH IF STAT SWITCH CLOSED

RTS

*** THIS ROUTINE IS USED TO RESET THE WATCHDOG TIMER

KICK    LDAA  #55H
        STAA  COPRST                        ENABLE THE WATCHDOG TIMER
        LDAA  #0AAH
        STAA  COPRST                        RESET THE WATCHDOG TIMER

RTS                                 RETURN TO THE PROGRAM

*** THIS IS THE WATCHDOG INTERUPT SERVICE ROUTINE

WAT_DOG LDX  #1004h
        BSET 00H,X,WAT_LIT                  TURN OFF THE STATUS LIGHT
        JMP  START
```

What is claimed is:

1. An x-ray film cassette transport apparatus comprising:
   (a) a housing having a window formed therein through which a cassette can be transferred;
   (b) a gripper driveably mounted inside said housing to carry out along an axis:
      (i) a cassette-loading movement, a predominant portion of which is directed away from said window, said cassette-loading movement taking place between a fixed home position and a retracted position; and
      (ii) a cassette-ejecting movement, a predominant portion of which is directed toward said window, said cassette-ejecting movement taking place between at least said retracted position and said home position;
   said gripper including a cassette-engaging member movable between a cassette-engaging position and a cassette-disengaging position, and means for both moving said member from said cassette-disengaging position to said cassette-engaging position during said cassette-loading movement and for moving said member from said cassette-engaging position to said cassette-disengaging position during said cassette-ejecting movement before said gripper reaches said home position.

2. The apparatus of claim 1 further comprising:
   control means operably connected to said gripper for arresting said cassette-ejecting movement of said gripper at an ejection position lying intermediate said retracted position and said home position.

3. The apparatus of claim 2 wherein said control means includes means for determining said ejection position as a function of the size of said cassette as measured along said axis.

4. The apparatus of claim 2 wherein said control means further acts to maintain said gripper arrested at said ejection position until said cassette is removed past a predetermined entry position which lies fixed with respect to said window.

5. An x-ray film cassette transport apparatus comprising:
   (a) a housing having a window formed therein through which a cassette can be passed;
   (b) a pair of guides driveably mounted within said housing for parallel, reciprocable movement toward and away from one another in a first direction, each of said guides being engageable with a respective side portion of the cassette, each of said guides being positioned the same distance from a given axis as the other throughout the range of said movement, said axis being oriented along a second direction substantially perpendicular to said first direction;
   (c) a track mounted within said housing, said track being oriented parallel said axis, at least a portion of said track lying between said guides but not necessarily coplanar with said guides;
   (d) a cam surface disposed in positionally-fixed relation to said track, said cam surface including at least a first portion and a second portion, said first and second portions lying offset from one another as measured in a particular direction; and
   (e) a cassette gripper driveably mounted on said track for reciprocable movement therealong toward and away from said window in said second direction between at least a home position and a retracted position, said gripper having a body and:
      (i) a cassette-engaging member movable between a cassette-engaging position and a cassette-disengaging position;
      (ii) a cam-follower engageable with said cam surface; and
      (iii) a mechanical linkage connecting said cassette-engaging member to said cam follower to move said cassette-engaging member from said cassette-disengaging position to said cassette-engaging position in response to movement of said gripper from said home position toward said retracted position and, in response to movement of said gripper from said retracted position toward said home position, moving said cassette-engaging member from said cassette-engaging position to said cassette-disengaging position before said gripper reaches said home position.

6. The apparatus of claim 5 wherein said cam-surface is located on said track.

7. The apparatus of claim 5 further comprising:
   (a) a first motor driveably coupled to said guides to effect said reciprocable movement of said guides when said first motor is energized;

(b) a second motor driveably coupled to said gripper to effect said reciprocable movement along said track when said second motor is energized;

(c) a cassette presence sensing system disposed at least partially on said gripper for generating and transmitting to said controller a first signal indicating the presence of a cassette in grippable proximity to said gripper; and (d) a controller linked to said sensor and to said first and second motors for selectively energizing and deenergizing each of said motors in accordance with a stored program.

8. The apparatus of claim 5 wherein said linkage comprises:

(a) an elevator connected to said cassette-engaging member, said elevator being mounted to said body for movement with respect thereto back and forth along a path between a first position corresponding to said cassette-disengaging position of said cassette-engaging member and a second position corresponding to said cassette-engaging position of said cassette-engaging member, and (b) a lever connected to said cam-follower, said lever being pivotably mounted to said body and including a projection engageable with said elevator to move said elevator to and fro along said path between said first and second elevator positions as said cam follower moves back and forth in said particular direction.

9. The apparatus of claim 8 wherein said cassette-engaging member includes a cassette gripping surface lying substantially in a plane, said plane being subtended by said inclined path by an angle, $\theta$, said gripping surface having a coefficient of static friction with respect to said cassette, $\mu_s$, wherein $\theta$ and $\mu_s$ are selected to substantially obey the equation:

$$\text{TAN } \theta < \mu_s,$$

whereby the gripping force exerted by said cassette-engaging member upon the cassette increases at a greater rate than the magnitude of a force tending to withdraw said cassette from said gripper in the direction of said axis increases.

10. The apparatus of claim 8 further comprising:

an element for exerting a bias force urging said elevator toward said second position so that said cassette-engaging member normally assumes said cassette-engaging position.

11. The apparatus of claim 10 wherein said bias force is of a magnitude selected to be great enough to cause said cassette-engaging member to be capable of gripping the cassette securely but small enough that said bias force can be overcome by the force transmitted to the elevator from said cam-follower through said linkage as said gripper is driven along said track.

12. The apparatus of claim 7 wherein said program includes instructions for:

(i) maintaining said second motor deenergized while energizing said first motor in a driving direction appropriate to cause said guides to be driven toward one another to engage said side portions of a cassette presented to said gripper in order to center the cassette about said axis and then;

(ii) deenergizing said first motor and then;

(iii) energizing said second motor in a driving direction appropriate to cause said cassette-engaging member of said gripper to move from said cassette-disengaging to said cassette-engaging position;

whereby the cassette is physically centered about said axis before it is engaged by said gripper.

13. The apparatus of claim 7 wherein said cassette presence sensing system comprises:

(a) a mechanical member mounted on said gripper and movable with respect thereto, said member including an actuator portion and a cassette-contacting surface, said cassette-contacting surface being displaceable by a cassette moved into grippable proximity of said gripper, such displacement causing said actuator portion to move from an inactive position to an active position; and (b) a sensing element mounted stationarily with respect to said home position, said sensing element generating said first signal responsive to proximity of said actuator portion only if both:

(i) said gripper is located substantially at said home position; and (ii) said actuator portion assumes said active position.

14. The apparatus of claim 7 further comprising:

at least one cassette side proximity sensor mounted on at least one of said guides for generating and transmitting to said controller a second signal indicating that at least one of said side portions of the cassette is in desired engagement with said at least one of said guides, said program including instructions for inhibiting energization of said second motor if said second signal is not transmitted to said controller.

15. The apparatus of claim 14 further comprising:

(a) a home position sensor for generating and transmitting to said controller a third signal indicating the presence of said gripper at said home position;

(b) an encoder coupled to said second motor for generating and transmitting to said controller at least one fourth signal correlated to the distance travelled by said gripper along said axis;

(c) a cassette position sensor for generating and transmitting to said controller a fifth signal when at least one predetermined part of the cassette passes a defined entry position which lies in a fixed position with respect to said home position; and (d) instructions included in said program for energizing said second motor in response to information derived from at least said first, second, third, fourth and fifth signals to move the cassette to a desired location along said axis.

16. The apparatus of claim 14 further comprising:

(a) an eject switch for generating and transmitting to said controller an eject signal; and (b) instructions included in said program for energizing said second motor in response to said eject signal to move said gripper toward said home position and deenergizing said motor when said gripper reaches a desired ejection position along said axis, said ejection position being determined by said controller in accordance with at least said first, third, fourth and fifth signals such that less than about half of the cassette, as measured in the direction of said axis, lies physically unsupported when said gripper reaches said ejection position.

17. The apparatus of claim 16 further comprising:

instructions included in said program for maintaining said second motor deenergized when said gripper is at said ejection position until said first signal and said fifth signal both change state thereby indicating that the cassette has been removed from the apparatus, and then energizing and subsequently deenergizing said second motor to position said gripper at said home position.

18. The apparatus of claim 16 wherein said ejection position is selected to lie along said axis at a point whereat said cam follower engages a portion of said cam surface shaped such that said linkage permits said cassette-engaging member to assume said cassette-disengaging position when said gripper is at said ejection position.

19. An apparatus for selectively gripping and releasing an x-ray film cassette, said apparatus comprising:
   (a) a housing having a window through which a cassette can be passed formed therein;
   (b) an elongated track mounted within said housing, said track being oriented parallel to an axis;
   (c) a cam surface disposed in fixed relation to said track, said cam surface including at least a first portion and a second portion, said first and second portions lying offset from one another as measured in a particular direction;
   (d) a gripper driveably mounted on said track for reciprocable movement therealong toward and away from said window between at least a home position and a retracted position, said gripper having a body
      (i) a cassette-engaging member movable between a cassette-engaging position and a cassette-disengaging position,
      (ii) a cam-follower engageable with said cam surface, and
      (iii) a mechanical linkage connecting said cassette-engaging member to said cam follower to move said cassette-engaging member from said cassette-disengaging position to said cassette-engaging position in response to movement of said gripper from said home position toward said retracted position and, in response to movement of said gripper from said retracted position toward said home position, moving said cassette-engaging member from said cassette-engaging position to said cassette-disengaging position before said gripper reaches said home position.

20. The apparatus of claim 19 wherein said linkage comprises:
   (a) an elevator connected to said cassette-engaging member, said elevator being mounted to said body for movement with respect thereto back and forth along a path between a first position corresponding to the cassette-disengaging position of said cassette-engaging member and a second position corresponding to the cassette-engaging position of said cassette-engaging member, and
   (b) a lever connected to said cam-follower, said lever being pivotably mounted to said body and including a projection engageable with said elevator to move said elevator to and fro along said path between said first and second elevator positions as said cam follower moves back and forth in said particular direction.

21. The apparatus of claim 16 wherein said cassette-engaging member includes a cassette gripping surface lying substantially in a plane, said plane being subtended by said inclined path by an angle, $\theta$, said gripping surface having a coefficient of static friction with respect to said cassette, $\mu_s$, wherein $\theta$ and $\mu_s$ are selected to substantially obey the equation:

$$\theta < \mu_s,$$

whereby the gripping force exerted by said cassette-engaging member upon the cassette increases at a greater rate than the magnitude of a force tending to withdraw said cassette from said gripper in the direction of said axis increases.

22. The apparatus of claim 20 further comprising:
   an element for exerting a bias force urging said elevator toward said second position so that said cassette-engaging member normally assumes said cassette-engaging position.

23. The apparatus of claim 22 wherein said bias force is of a magnitude selected to be great enough to cause said cassette-engaging member to be capable of gripping the cassette securely but small enough that said bias force can be overcome by the force transmitted to the elevator from said cam-follower through said linkage as said gripper is driven along said track.

24. The apparatus of claim 20 wherein said cam-surface is located on said track.

25. The apparatus of claim 19 further comprising:
   (a) a motor driveably coupled to said gripper to effect said reciprocable movement of said gripper along said track when said motor is energized;
   (b) a cassette presence sensing system disposed at least partially on said gripper for generating and transmitting to said controller a first signal indicating the presence of a cassette in grippable proximity to said gripper; and
   (c) a controller linked to said sensor and to said motor for selectively energizing and deenergizing said motor in accordance with a stored program.

26. The apparatus of claim 25 wherein said cassette presence sensing system comprises:
   (a) a mechanical member mounted on said gripper and movable with respect thereto, said member including an actuator portion and a cassette-contacting surface, said cassette-contacting surface being displaceable by a cassette moved into grippable proximity of said gripper, such displacement causing said actuator portion to move from an inactive position to an active position; and
   (b) a stationarily mounted sensing element, said sensing element generating said first signal responsive to proximity of said actuator portion only if both:
      (i) said gripper is located substantially at said home position; and
      (ii) said actuator portion assumes said active position.

27. The apparatus of claim 26 further comprising:
   (a) a home position sensor for generating and transmitting to said controller a second signal indicating the presence of said gripper at said home position;
   (b) an encoder coupled to said motor for generating and transmitting to said controller at least one third signal correlated to the distance travelled by said gripper along said axis;
   (c) a cassette position sensor for generating and transmitting to said controller a fifth signal when at least one predetermined part of the cassette passes a defined entry position which lies in a fixed position with respect to said home position; and
   (d) instructions included in said program for energizing said motor in response to information derived from at least said first, second, third, fourth and fifth signals to move the cassette to a desired location along said axis.

28. The apparatus of claim 26 further comprising:
(a) an eject switch for generating and transmitting to said controller an eject signal; and
(b) instructions included in said program for energizing said motor in response to said eject signal to move said gripper toward said home position and deenergizing said motor when said gripper reaches a desired ejection position, said ejection position being determined by said controller in accordance with at least said first, third, and fourth signals such that less than about half of the cassette as measured in the direction of said axis lies physically unsupported when said gripper reaches said ejection position.

29. The apparatus of claim 28 further comprising:
instructions included in said program for maintaining said motor deenergized when said gripper is at said ejection position until said first signal and said fifth signal both change state thereby indicating that the cassette has been removed clear of said entry position and then energizing and subsequently deenergizing said motor to position said gripper at said home position.

30. The apparatus of claim 28 wherein said ejection position is selected to lie at a point along said axis whereat said cam follower engages a portion of said cam surface shaped such that said linkage permits said cassette-engaging member to assume said cassette-disengaging position when said gripper is at said ejection position.

31. The apparatus of claim 20 further comprising:
(a) a motor driveably coupled to said gripper to effect said reciprocable movement along said track when said motor is energized;
(b) a cassette presence sensing system disposed at least partially on said gripper for generating and transmitting to said controller a first signal indicating the presence of a cassette in grippable proximity to said gripper; and
(c) a controller linked to said sensor and to said motor for selectively energizing and deenergizing said motor in accordance with a stored program.

32. The apparatus of claim 31 wherein said cassette presence sensing system comprises:
(a) a mechanical member mounted on said gripper and movable with respect thereto, said member including an actuator portion and a cassette-contacting surface, said cassette-contacting surface being displaceable by a cassette moved into grippable proximity of said gripper, such displacement causing said actuator portion to move from an inactive position to an active position; and
(b) a stationarily mounted said sensing element generating said first signal responsive to proximity of said actuator portion only if both:
  (i) said gripper is located substantially at said home position; and
  (ii) said actuator portion assumes said active position.

33. The apparatus of claim 31 further comprising:
(a) a home position sensor for generating and transmitting to said controller a second signal indicating the presence of said gripper at a defined home position along said axis;
(b) an encoder coupled to said motor for generating and transmitting to said controller information indicative of the distance travelled by said gripper along said axis;
(c) a cassette position sensor for generating and transmitting to said controller a fifth signal when at least one predetermined part of the cassette passes a defined entry position which lies in a fixed position with respect to said home position; and
(d) instructions included in said program for energizing said motor in response to information derived from at least said first, second, third, fourth and fifth signals to move the cassette to a desired location along said axis.

34. The apparatus of claim 31 further comprising:
(a) an eject switch for generating and transmitting to said controller an eject signal; and
(b) instructions included in said program for energizing said motor in response to said eject signal to move said gripper toward said home position and deenergizing said motor when said gripper reaches a desired ejection position, said ejection position being determined by said controller in accordance with at least said first, third, fourth and fifth signals such that less than about half of the cassette, as measured in the direction of said axis, lies physically unsupported when said gripper reaches said ejection position.

35. The apparatus of claim 34 further comprising:
instructions included in said program for maintaining said motor deenergized when said gripper is at said ejection position until said first signal and said fifth signal both change state thereby indicating that the cassette has been removed from the apparatus, and then energizing and subsequently deenergizing said motor to position said gripper at said home position.

36. The apparatus of claim 34 wherein said ejection position is selected to lie along said axis at a point whereat said cam follower engages a portion of said cam surface shaped such that said linkage permits said cassette-engaging member to assume said cassette-disengaging position when said gripper is at said ejection position.

* * * * *

UNITED STATES PATENT AND TRADEMARK OFFICE
CERTIFICATE OF CORRECTION

PATENT NO. : 5,062,130
DATED : October 29, 1991
INVENTOR(S) : Frank M. Fago

It is certified that error appears in the above-identified patent and that said Letters Patent is hereby corrected as shown below:

Col. 11, line 36, "10" should be --108--

Col. 63, line 29, after "body" insert --and:--

Col. 64, line 5, before equation insert --TAN--

Col. 65, line 56, omit "said"

Col. 65, line 56, after "element" insert --, said sensing element--

Signed and Sealed this

Twenty-eighth Day of September, 1993

Attest:

BRUCE LEHMAN

*Attesting Officer*     *Commissioner of Patents and Trademarks*